(12) United States Patent
McLeod

(10) Patent No.: US 7,587,536 B2
(45) Date of Patent: Sep. 8, 2009

(54) METHOD AND APPARATUS FOR DISTRIBUTING USB HUB FUNCTIONS ACROSS A NETWORK

(75) Inventor: John Alexander McLeod, Surrey (CA)

(73) Assignee: Icron Technologies Corporation, Burnaby, British Columbia (CA)

( * ) Notice: Subject to any disclaimer, the term of this patent is extended or adjusted under 35 U.S.C. 154(b) by 412 days.

(21) Appl. No.: 11/460,963

(22) Filed: Jul. 28, 2006

(65) Prior Publication Data

US 2008/0028120 A1      Jan. 31, 2008

(51) Int. Cl.
*G06F 13/12* (2006.01)

(52) U.S. Cl. .................. 710/65; 710/315; 370/401

(58) Field of Classification Search ........... 370/466, 370/401–402; 710/313–315, 62, 65, 5
See application file for complete search history.

(56) References Cited

U.S. PATENT DOCUMENTS

| | | |
|---|---|---|
| 5,588,140 A | 12/1996 | Misukanis et al. |
| 5,781,747 A | 7/1998 | Smith et al. |
| 5,784,581 A | 7/1998 | Hannah |
| 5,797,028 A | 8/1998 | Gulick et al. |
| 5,799,041 A | 8/1998 | Szkopek et al. |
| 5,878,221 A | 3/1999 | Szkopek et al. |
| 5,890,015 A | 3/1999 | Garney et al. |
| 5,983,073 A | 11/1999 | Ditzik |
| 6,185,641 B1 | 2/2001 | Dunnihoo |
| 6,308,215 B1 | 10/2001 | Kolbet et al. |
| 6,381,666 B1 | 4/2002 | Kejser et al. |
| 6,389,029 B1 | 5/2002 | McAlear |
| 6,697,372 B1 | 2/2004 | McAlear |
| 6,721,332 B1 * | 4/2004 | McAlear ................. 370/466 |
| 6,965,614 B1 | 11/2005 | Osterhout |
| 7,185,136 B2 * | 2/2007 | Zarns ..................... 710/315 |
| 7,428,606 B2 * | 9/2008 | Liu et al. ................. 710/62 |
| 2002/0141418 A1 * | 10/2002 | Ben-Dor et al. ........... 370/398 |
| 2002/0144042 A1 | 10/2002 | Garney |
| 2004/0177197 A1 | 9/2004 | McLeod |
| 2004/0205279 A1 | 10/2004 | Ohnishi |
| 2006/0020736 A1 | 1/2006 | Jackson |
| 2006/0206636 A1 | 9/2006 | McLeod |
| 2008/0010340 A1 * | 1/2008 | Orady et al. ............ 709/203 |

OTHER PUBLICATIONS

Patent Abstracts of Japan; vol. 2000, No. 09, Oct. 13, 2000; & JP 2000-183920 A (Matsushita Electrci Ind. Co. Ltd.), Jun. 30, 2000.
Universal Serial Bus Specification, Rev. 2.0, Apr. 27, 2000, Compaq Computer Corp. et al., Section 8.4.5. Selected pages.
Universal Serial Bus Mass Storage Class, Bulk-only Transport, Rev. 1.0, Sep. 13, 1999.

* cited by examiner

*Primary Examiner*—Clifford H Knoll
(74) *Attorney, Agent, or Firm*—Gerald A. Gowan; Gowan Intellectual Property

(57) ABSTRACT

A method and related apparatuses for data transmission between a host computer and one or a plurality of USB compliant peripheral devices over a data communications network is provided which operates in the presence of transmission delays greater than that normally allowed in the USB specification. The host computer is connected to a local extender device which, in turn, is connected to one or a plurality of remote extender devices through the data communications network. The remote extender devices are, in turn, connected to a plurality of conventional USB peripheral devices. Data between the host computer and peripheral devices is stored and processed in the local and remote extender devices in order to allow the host computer and the USB peripheral devices to operate with greater than normally allowed time delays. In particular, the invention is of most utility when the round-trip transmission delay between the host computer and the USB peripheral device exceeds 1 microsecond.

14 Claims, 14 Drawing Sheets

| Device | Parent | | Child | | | | Network |
|---|---|---|---|---|---|---|---|
| | Address | Port | Port #1 | Port #2 | Port #3 | Port #4 | |
| " | | | | | | | |
| " | | | | | | | |
| 31 | Null | Null | 32 | 42 | - | 33 | N0 |
| 32 | 31 | 1 | 40 | - | 41 | - | N1 |
| 33 | 31 | 4 | - | 43 | 34 | - | N3 |
| 34 | 33 | 3 | 44 | - | - | 45 | |
| " | | | | | | | |
| " | | | | | | | |
| 40 | 32 | 1 | | | | | |
| 41 | 32 | 3 | | | | | |
| 42 | 31 | 2 | | | | | N2 |
| 43 | 33 | 2 | | | | | |
| 44 | 34 | 1 | | | | | |
| 45 | 34 | 4 | | | | | |

*Figure 10*

METHOD AND APPARATUS FOR DISTRIBUTING USB HUB FUNCTIONS ACROSS A NETWORK

FIELD OF THE INVENTION

This invention relates to methods and apparatus for transmitting signals between computers and devices using Universal Serial Bus (USB) ports, and, in particular, to a method for operating a plurality of USB peripheral devices distributed across a data communications network.

DESCRIPTION OF THE PRIOR ART

Universal Serial Bus (USB) is a technology designed to permit a wide range of peripherals to be attached to personal computers by the average user. The technology supports all of the common peripheral devices such as keyboards, mice, speakers, joysticks, cameras, flash drives, hard drives, DVD drives and many others, and its use in current computers is common.

USB was created by an alliance of seven of the largest companies in the computer and communication markets. Those companies were Intel, Compaq, Microsoft, NorTel, NEC, Digital and IBM. The specifications defining USB (e.g. Intel et al., Universal Serial Bus Specification, Revision 1.0, January 1996; and updated as Revision 1.1 in Sep. 23, 1998, and further updated as Revision 2.0 in April 2000, and subsequent updates, additions and modifications—hereinafter collectively referred to as the "USB Specification", which term can include future modifications and revisions) are nonproprietary and are managed by an open industry organization known as the USB Implementers Forum (USB-IF). The USB Specification establishes a number of criteria which must be met in order to comply with USB standards. The USB Specification also defines a number of terms, which definitions are adopted for the purposes of this specification.

Under the USB specification, data communication is managed by a USB host controller unit installed, preferably, in a host computer. Furthermore, said data communication occurs in a series of USB transactions wherein each USB transaction is initiated by a USB host controller and is composed of one, two or three subactions. Each subaction is terminated by a reversal in the direction of data flow.

Of most relevance to the present invention, however, is the feature that all known USB Specifications currently limit the distance that a device can be separated from its host computer to a maximum of 5 meters. By using a series of USB Hubs—devices that are intended to support increased populations rather than increased distances—this distance limitation can be increased, in theory, to 30 meters. However, this multiple hub solution is both expensive and clumsy.

In U.S. Pat. No. 6,381,666, the contents of which are incorporated herein by reference, a method and apparatus for extending the distance between a host computer and a peripheral device, is provided which increased the useable distance to 100 meters or more. While this approach has been beneficial, it would still be desirable to provide alternative and/or improved methods and apparatus for achieving this same effect.

The major factor that limits the extent to which the range of USB can be extended is transmission delay. The USB Specification allows a maximum period of approximately 1.5 microseconds for the round-trip delay of a single communication from a host computer to a device and back to the computer. The round-trip delay budget of 1.5 microseconds is composed of two approximately equal parts, namely, the transmission delay in both directions between the host computer and the device and secondly, the turn-around time required by the device to create the desired response. The approach described in U.S. Pat. No. 6,381,666 removed this restriction on the upper limit of round-trip delay.

While the approach described in U.S. Pat. No. 6,381,666 made it possible to operate USB peripheral devices over an extended distance and in the presence of long transmission delays, it did not describe a configuration in which a plurality of USB peripheral devices are widely separated from each other. Although a requirement to widely separate USB peripheral devices controlled by a single host computer can be accommodated by utilizing multiple instantiations of the approach described in U.S. Pat. No. 6,381,666, it would be beneficial to devise a more flexible and cost-effective approach.

Of further relevance to the present invention is the feature that all known USB Specifications currently require that a USB hub be employed whenever multiple USB peripheral devices are required to be connected simultaneously to a single port on a USB host controller. It is an attribute of a USB hub that said hub be equipped with a single upstream port for connecting to a USB host controller (or upstream hub) and a plurality of downstream ports for connecting to a plurality of USB peripheral devices (or downstream hubs). The USB driver software resident in the host computer that contains the USB host controller is aware of the connection topology of USB hubs and USB peripheral devices and will fail to operate if said topology is not maintained.

Thus it has been demonstrated that supporting a plurality of USB peripheral devices from a single USB host controller requires that a USB hub be connected between said USB peripheral devices and said USB host controller and that said USB hub must be equipped with an individual downstream port for each USB peripheral device. However, if it is desired to insert a data communications network between said USB hub and said USB peripheral devices, then it would be advantageous to concentrate all USB traffic travelling between said USB hub and said data communications network over a single physical connection.

Of yet further relevance to the present invention is the feature that all known USB Specifications currently require that each downstream port of a USB hub supports control and monitoring of the physical connection between said downstream port and any USB peripheral device that may be connected thereto. In particular, said downstream port must be able to detect the connection and disconnection of a USB peripheral device, and must be able to reset, suspend and resume the operation of said USB peripheral device. It would be advantageous to maintain said connection, disconnection, reset, suspend and resume capabilities normally associated with individual physical connections when said individual physical connections are replaced by a shared connection to a data communications network.

SUMMARY OF THE INVENTION

Accordingly, while the range extending USB technology, as described in U.S. Pat. No. 6,381,666 has proven to be useful in point-to-point configurations, it would still be desirable to provide improvements to the technology by providing an improved method and apparatus for enabling a plurality of peripheral devices, utilizing the USB specification, to be distributed at various locations across a network, wherein said network may exhibit long transmission delays.

Therefore, it is an objective of the present invention to provide methods and apparatus to enable a plurality of USB peripheral devices to be connected through a virtual USB hub to a host computer equipped with a USB host controller.

It is a further object of the present invention that the functions of said virtual USB hub may be distributed across a data communications network.

It is a further object of the present invention that said host computer may be connected to said data communications network through a single physical connection.

It is a further object of the present invention that said data communications network may exhibit transmission delays that exceed the parameters defined by the USB Specification.

It is a further object of the present invention that said plurality of USB peripheral devices and said USB host controller may operate at any of the data rates permitted under the USB 2.0 Specification.

It is a further object of the present invention that a virtual USB peripheral device may be connected to said virtual USB hub.

It is a further object of the present invention that no hardware or software changes need be made to the existing host computers, hubs and devices supported by the system and operating under the USB protocol. The invention, thereby, may be incorporated into networks composed of both conventional delay and extended delay devices.

It is a further object of the present invention that no prior knowledge of the arrangement of said plurality of USB peripheral devices with respect to said data communications network be required.

It is a further object of the present invention that the USB device management functions of connection, disconnection, reset, suspend and resume shall operate consistent with the prior art USB specifications when the prior art physical connections are replaced by a network connection as described by the present invention.

It is a further object of the present invention that the apparatus be very cost effective, consistent with the broadest population of devices targeted by the USB industry.

These and other objects of the invention, which will become apparent herein, are fully or at least partially attained by the present invention which invention provides a method and related apparatuses, wherein a host computer is connected to a local extender device which, in turn, is connected to one or a plurality of remote extender devices through a data communications network. The remote extender devices are, in turn, connected to a plurality of conventional USB peripheral devices, wherein signals between said host computer and said USB peripheral devices are processed in the local extender and/or the remote extenders so as to allow the host computer and the USB peripheral devices to operate in the presence of transmission delays greater than that normally allowed in the USB specification. In particular, the invention is of most utility when the round-trip transmission delay between the host computer and the USB peripheral device exceeds 1 microsecond.

Accordingly, in a first aspect, the present invention provides a computer system for transmitting data between a host computer and one or a plurality of USB peripheral devices, wherein said USB peripheral devices are distributed around a data communications network and wherein the transmission delay across said network is greater than that normally allowed by the USB specification, said computer system comprising a host computer connected to a local extender device which, in turn, is connected to one or a plurality of remote extender devices through a data communications network and which, in turn, are connected to a plurality of USB peripheral devices, wherein signals between said host computer and said USB peripheral devices are saved, collected, absorbed, or otherwise processed in the local extender and/or the remote extenders so as to allow the host computer and the USB peripheral devices to operate in the presence of a round trip delay greater than that normally allowed in the USB specification.

Preferably, the round-trip delay comprises a transmission delay and a turn-around time delay, and wherein said transmission delay between the host computer and the USB peripheral device exceeds 1 microsecond.

As such, the present invention provides a computer system for transmitting data between a host computer and one or a plurality of USB peripheral devices wherein said USB peripheral devices may be distributed around a data communications network and wherein the transmission delay across said network is greater than that normally allowed by the USB specification, said computer system comprising:

a) a host computer for generating and accepting USB subactions;

b) one or a plurality of USB peripheral devices capable of responding to USB subactions initiated by said host computer;

c) a local extender unit connected to said host computer for forwarding USB subactions from said host computer to a data communications network, and for forwarding USB subactions received from said data communications network to said host computer;

d) one or a plurality of remote extender units each of which is connected to one or a plurality of USB peripheral devices, for forwarding USB subactions received from said data communications network to said USB peripheral devices, and for forwarding USB subactions received from said USB peripheral devices to said data communications network;

e) a data communications network for forwarding USB subactions from said local extender unit to said remote extender units, and for forwarding USB subactions from said remote extender units to said local extender unit;

f) means in said local extender unit for forwarding a USB subaction received from said host computer to said remote extender unit over said data communications network, and for generating and sending a generated USB subaction to said host computer;

g) means in said remote extender unit for forwarding said USB subaction received from said host computer to one or a plurality of USB peripheral devices, and for receiving a subaction received from a USB peripheral device;

h) means in said remote extender unit for forwarding said subaction received from a USB peripheral device to said local extender unit over said data communications network;

i) means in said remote extender unit for generating a USB subaction in confirmation of a USB subaction received from a USB peripheral device and sending said generated confirm USB subaction to said USB peripheral device;

j) means in said remote extender unit for generating a USB subaction in response to a USB subaction received from said host computer and sending said generated response USB subaction to said local extender unit;

k) means in said local extender unit for receiving and identifying when a sequence of inbound USB subactions received from said remote extender unit over said data communications network are related to a common outbound USB subaction;

l) means in said local extender unit for storing an inbound USB subaction from said remote extender unit until such inbound USB subaction is again requested by said host computer; and m) means in said local extender unit for forwarding said stored USB subaction to said host computer.

The computer system also preferably comprises:

a) means, preferably in said local extender unit, for absorbing replicated USB subactions;

b) means in said remote extender unit for assembling a sequence of USB subactions into an atomic USB subaction and preferably sending said atomic USB subaction to said USB peripheral device; and c) means in said remote extender unit for disassembling an atomic USB subaction into a sequence of discrete USB subactions and preferably sending said sequence of discrete USB subactions to said local extender unit.

In a further aspect, the present invention also provides a local extender apparatus for transmitting USB traffic between a host computer and a data communications network, in a computer system as described hereinabove with respect to the present invention, wherein said USB traffic may be addressed to a plurality of USB peripheral devices, said apparatus comprising:

a) a USB transceiver for connecting to said host computer;

b) an upstream-facing port for controlling said USB transceiver;

c) a local repeater unit for regenerating USB subactions passing through said apparatus and for switching USB subactions between the components of said apparatus;

d) a memory unit for storing USB subactions during processing by said apparatus;

e) a local router unit for providing a network address for USB subactions moving in a downstream (host to network) direction;

f) a network transceiver for connecting to said data communications network;

g) a hub controller unit for responding to subactions generated by said host computer regarding the status of said plurality of USB peripheral devices;

h) means for instantiating a plurality of virtual ports for managing the status of said plurality of USB peripheral devices;

i) means for instantiating a plurality of virtual USB devices for providing value-added functions;

j) means in said local repeater for identifying USB subactions addressed to said hub controller;

k) means in said local repeater for identifying USB subactions addressed to said plurality of virtual USB devices;

l) means in said plurality of instantiated virtual ports for maintaining the status of said plurality of USB peripheral devices;

m) means in said plurality of instantiated virtual ports for receiving device status change signals from said data communications network and updating the status of said plurality of USB peripheral devices; and n) means in said hub controller for receiving device management commands from said host computer and sending device management signals to said data communications network.

In a further aspect, the present invention also provides a remote extender apparatus for transmitting USB subactions between a data communications network and a USB peripheral device, in a computer system as described hereinabove with respect to the present invention, said apparatus comprising:

a) a network transceiver for connecting to said data communications network;

b) a remote router unit for providing a network address for USB subactions moving in an upstream (network to host) direction;

c) a remote repeater unit for regenerating USB subactions passing through said apparatus and for switching USB subactions between the components of said apparatus;

d) a transaction translator unit for converting between high-speed split transactions and full-speed/low-speed atomic transactions;

e) a memory unit for storing USB subactions during processing by said apparatus;

f) a USB transceiver for connecting to said USB peripheral device;

g) a downstream-facing port for controlling said USB transceiver;

h) means in said remote router unit for identifying split transactions;

i) means in said downstream port controller for detecting the status of said USB peripheral device;

j) means in said downstream port controller for generating device status signals and sending said signals to said data communications network;

k) means in said downstream port controller for receiving device management signals from said data communications network; and l) means in said downstream port controller for changing the status of said USB peripheral device.

To operate, the system preferably includes means for, and the ability to detect the attachment of a USB peripheral device to the system, to detect the detachment of a USB peripheral device, and to determine the network address of a USB function wherein said USB function may be a USB hub or a USB peripheral device.

As such, in a further aspect, the present invention provides a method for detecting the attachment of a USB peripheral device, preferably over a data communications network in which the round-trip delay exceeds 1 microsecond, by a host computer, wherein said host computer and said USB peripheral device conform to the requirements of the USB Specification, through a local extender and a remote extender, which method comprises:

a) detecting at said remote extender a device attachment event, having said remote extender send a device connect signal to said local extender, and then having said local extender update its local record of the change in connection status of said USB peripheral device and its local record of the connected status of said USB peripheral device;

b) receiving at said local extender a request from said host computer for device status change information and having said local extender inform said host computer that the status of said USB peripheral device has changed;

c) receiving at said local extender a request from said host computer for the status of said USB peripheral device and having said local extender provide said local record of the change in connection status and said local record of connected status to said host computer;

d) receiving at said local extender a request from said host computer to clear said change in connection status information and having said local extender clear said local record of the change in connection status information;

e) receiving at said local extender a further request from said host computer for the status of said USB peripheral device and having said local extender provide said cleared local record of the change in connection status and said local record of connected status to said host computer;

f) receiving at said local extender a command from said host computer to reset said USB peripheral device, having said local extender send a reset signal to said remote extender, and then having said remote extender perform a physical reset on said USB peripheral device;

g) detecting at said remote extender the transmission speed of said USB peripheral device, having said remote extender send a speed signal to said local extender, and then having said local extender update its local record of the transmission speed of said USB peripheral device and its local record of the change in reset status of said USB peripheral device;

h) receiving at said local extender a further request from said host computer for device status change information and having said local extender inform said host computer that the status of said USB peripheral device has changed;

i) receiving at said local extender a yet further request from said host computer for the status of said USB peripheral device and having said local extender provide said local record of the transmission speed of said USB peripheral device and its local record of the change in reset status of said USB peripheral device to said host computer;

j) receiving at said local extender a request from said host computer to clear said change in reset status information and having said local extender clear said local record of the change in reset status information; and k) receiving at said local extender a request from said host computer for the status of said USB peripheral device and having said local extender provide said cleared local record of the change in reset status to said host computer.

In a further aspect, the present invention provides a method for detecting the detachment of a USB peripheral device, preferably over a data communications network in which the round-trip delay exceeds 1 microsecond, by a host computer, wherein said host computer and said USB peripheral device conform to the requirements of the USB Specification, through a local extender and a remote extender, which method comprises:

a) detecting at said remote extender a device detachment event, having said remote extender send a device disconnect signal to said local extender, and then having said local extender update its local record of the change in connection status of said USB peripheral device and its local record of the connected status of said USB peripheral device;

b) receiving at said local extender a request from said host computer for device status change information and having said local extender inform said host computer that the status of said USB peripheral device has changed;

c) receiving at said local extender a request from said host computer for the status of said USB peripheral device and having said local extender provide said local record of the change in connection status and said local record of connected status to said host computer;

d) receiving at said local extender a request from said host computer to clear said change in connection status information and having said local extender clear said local record of the change in connection status information;

e) receiving at said local extender a request from said host computer to clear the enabled status information of said USB peripheral device and having said local extender clear its local record of enabled status information; and f) receiving at said local extender a further request from said host computer for the status of said USB peripheral device and having said local extender provide said cleared local record of the change in connection status and said cleared local record of enabled status to said host computer.

In a further aspect, the present invention provides a method for determining the network address of a USB function wherein said USB function may be a USB hub or a USB peripheral device, and wherein a plurality of said USB functions may be distributed around a data communications network, and wherein a USB address is allocated to each USB function by a host computer, which method comprises:

a) building a data record for each first USB function connected directly or indirectly to said network and identifying each record by a unique USB address assigned dynamically by said host computer;

b) recording within said data record the USB address of the upstream USB hub to which said first USB function is connected;

c) recording within said data record the port number of the upstream USB hub to which said first USB function is connected;

d) recording within said data record the USB address of each downstream USB function connected directly to said first USB function;

e) recording within said data record the port number of said first USB function to which each downstream USB function is connected; and f) recording the network address assigned to said first USB function.

In a further aspect, the present invention also provides a method for transmitting data between a host computer and one or a plurality of USB peripheral devices, wherein said USB peripheral devices are distributed around a data communications network and wherein the transmission delay across said network is greater than that normally allowed by the USB specification, said method comprising connecting a host computer to a local extender device, connecting said local extender device to one or a plurality of remote extender devices through a data communication network, and connecting said remote extender devices to one or a plurality of USB peripheral devices, wherein signals between said host computer and said USB peripheral devices are saved, collected, absorbed, or otherwise processed in the local extender and/or the remote extenders so as to allow the host computer and the USB peripheral devices to operate in the presence of a round trip delay greater than that normally allowed by the USB specification.

In more detail, the present invention provides a method for transmitting a USB command from a host computer, through a local extender, to a unique network address on a data communications network, which method comprises:

a) receiving at a local extender a USB command from a host computer;

b) extracting a first USB address from said USB command;

c) using said first USB address to access a first data record within a table of similar records;

d) determining whether said first data record contains a valid network address;

e) extracting from said first data record a second USB address identifying the upstream USB hub through which said first USB address may be accessed;

f) repeating steps (c) through (e) until a valid network address is found;

g) encapsulating said USB command in a network packet;

h) addressing said network packet to said valid network address; and i) transmitting said addressed network packet to said data communications network.

In a further aspect, the present invention provides a method for conducting asynchronous data transactions, preferably over a data communications network in which the round-trip delay exceeds 1 microsecond, between a host computer and a USB peripheral device, wherein said host computer operates at high-speed and said USB peripheral device operates at classic-speed (full-speed or low-speed), and wherein said data travels in a device to host direction, through a remote extender and a local extender, which method comprises:

a) receiving at a local extender a first request from said host computer for the start of a split data transfer session, having said local extender forward said first request across a network to said remote extender, and then having said local extender generate a negative acknowledgement response to said host computer;

b) receiving at a local extender a subsequent request from said host computer for the start of a split data transfer session and having said local extender continue to generate negative acknowledgement responses to said host computer until said local extender receives a response to said forwarded first request from said remote extender;

c) receiving at a remote extender said forwarded first request for the start of a split data transfer session, having said remote extender convert said forwarded request for the start of a split data transfer session into a classic-speed request for data transfer, and then having said remote extender forward said classic-speed request for data transfer to said USB peripheral device;

d) generating at a remote extender a positive acknowledgement response and forwarding said positive acknowledgement response across a network to said local extender;

e) receiving at a local extender said forwarded positive acknowledgement response and having said local extender store said forwarded positive acknowledgement response in local memory;

f) receiving at a local extender a further request from said host computer for the start of a split data transfer session, having said local extender retrieve from local memory said forwarded positive acknowledgement response, and then having said local extender forward said retrieved positive acknowledgement response to said host computer;

g) receiving at a remote extender a data transfer response from said USB peripheral device and having said remote extender generate a positive acknowledgement response to said USB peripheral device, and then having said remote extender forward said data transfer response across a network to said local extender;

h) receiving at a local extender a first request for completion of a split data transfer session, having said local extender check local memory for the absence of a data transfer response, and then having said local extender generate a not-yet acknowledgement to said host computer;

i) receiving at a local extender said forwarded data transfer response from said remote extender and having said local extender store said forwarded data transfer response in local memory; and j) receiving at a local extender a further request for completion of a split data transfer session, having said local extender retrieve from local memory said forwarded data transfer response, and then having said local extender forward said retrieved data transfer response to said host computer.

In a further aspect, the present invention provides a method for conducting asynchronous data transactions, preferably over a data communications network in which the round-trip delay exceeds 1 microsecond, between a host computer and a USB peripheral device, wherein said host computer operates at high-speed and said USB peripheral device operates at classic-speed (full-speed or low-speed), and wherein said data travels in a host to device direction, through a local extender and a remote extender, which method comprises:

a) receiving at a local extender a first notification from said host computer for the start of a split data transfer session, having said local extender forward said first notification across a network to said remote extender, and then having said local extender generate a negative acknowledgement response to said host computer;

b) receiving at a local extender a subsequent notification from said host computer for the start of a split data transfer session and having said local extender continue to generate negative acknowledgement responses to said host computer until said local extender receives a response to said forwarded first notification from said remote extender;

c) receiving at a remote extender said forwarded first notification for the start of a split data transfer session, having said remote extender convert said forwarded notification for the start of a split data transfer session into a classic-speed notification for data transfer, and then having said remote extender forward said classic-speed notification for data transfer to said USB peripheral device;

d) generating at a remote extender a positive acknowledgement response and forwarding said positive acknowledgement response across a network to said local extender;

e) receiving at a local extender said forwarded positive acknowledgement response and having said local extender store said forwarded positive acknowledgement response in local memory;

f) receiving at a local extender a further notification from said host computer for the start of a split data transfer session, having said local extender retrieve from local memory said forwarded positive acknowledgement response, and then having said local extender forward said retrieved positive acknowledgement response to said host computer;

g) receiving at a remote extender a positive acknowledgement response from said USB peripheral device and having said remote extender forward said positive acknowledgement response across a network to said local extender;

h) receiving at a local extender a first request for completion of a split data transfer session, having said local extender check local memory for the absence of a positive acknowledgement response, and then having said local extender generate a not-yet acknowledgement to said host computer;

i) receiving at a local extender said forwarded positive acknowledgement response from said remote extender and having said local extender store said forwarded positive acknowledgement response in local memory; and j) receiving at a local extender a further request for completion of a split data transfer session, having said local extender retrieve from local memory said forwarded positive acknowledgement response, and then having said local extender forward said retrieved positive acknowledgement response to said host computer.

In a further aspect, the present invention provides a method for conducting isochronous data transactions, preferably over a data communications network in which the round-trip delay exceeds 1 microsecond, between a host computer and a USB peripheral device, wherein said host computer operates at high-speed and said USB peripheral device operates at classic-speed (full-speed or low-speed), and wherein said data travels in a device to host direction, through a remote extender and a local extender, which method comprises:
  a) receiving at a local extender a first request from said host computer for the start of a split data transfer session and having said local extender forward said first request for the start of a split data transfer session across a network to said remote extender;
  b) receiving at a local extender a first request for completion of a split data transfer session, having said local extender check local memory for the absence of a complete sequence of split data transfer responses, and then having said local extender generate a null data response to said host computer;
  c) receiving at a remote extender said forwarded first request for the start of a split data transfer session, having said remote extender convert said forwarded request for the start of a split data transfer session into a classic-speed request for data transfer, and then having said remote extender forward said classic-speed request for data transfer to said USB peripheral device;
  d) receiving at a remote extender a data transfer response from said USB peripheral device and having said remote extender convert said received data transfer response into a sequence of split data transfer responses, and then having said remote extender forward said sequence of split data transfer responses across a network to said local extender;
  e) receiving at a local extender said forwarded sequence of split data transfer responses from said remote extender and having said local extender store said forwarded sequence of split data transfer responses in local memory;
  f) receiving at a local extender a subsequent request from said host computer for the start of a split data transfer session and having said local extender forward said subsequent request across a network to said remote extender; and
  g) receiving at a local extender a sequence of subsequent requests for completion of a split data transfer session, having said local extender check local memory for the presence of a complete sequence of split data transfer responses, and then having said local extender retrieve said sequence of split data responses from memory and forward said sequence of split data responses to said host computer.

In a further aspect, the present invention provides a method for conducting isochronous data transactions, preferably over a data communications network in which the round-trip delay exceeds 1 microsecond, between a host computer and a USB peripheral device, wherein said host computer operates at high-speed and said USB peripheral device operates at classic-speed (full-speed or low-speed), and wherein said data travels in a host to device direction, through a local extender and a remote extender, which method comprises:
  a) receiving at a local extender a notification from said host computer for the start of a split data transfer session, having said local extender forward said notification for the start of a split data transfer session across a network to said remote extender, and then having said remote extender store said notification for the start of a split data transfer session in local memory;
  b) receiving at a local extender a first notification from said host computer for the continuation of a split data transfer session, having said local extender forward said first notification for the continuation of a split data transfer session across a network to said remote extender, and then having said remote extender store said first notification for the continuation of a split data transfer session in local memory;
  c) receiving at a local extender a further notification from said host computer for the continuation of a split data transfer session, having said local extender forward said further notification for the continuation of a split data transfer session across a network to said remote extender, and then having said remote extender store said further notification for the continuation of a split data transfer session in local memory;
  d) receiving at a local extender a notification from said host computer for the completion of a split data transfer session, having said local extender forward said notification for the completion of a split data transfer session across a network to said remote extender, and then having said remote extender store said notification for the completion of a split data transfer session in local memory;
  e) assembling at a remote extender said stored notification for the start of a split data transfer, said stored first notification for the continuation of a split data transfer, said stored further notification for the continuation of a split data transfer and said stored notification for the completion of a split data transfer session into a classic-speed notification of data transfer; and
  f) having said remote extender forward said classic-speed notification of data transfer to said USB peripheral device.

DESCRIPTION OF THE PREFERRED EMBODIMENTS

In a preferred embodiment, the host computer and the USB peripheral device can be any standard unit or device that supports the USB Specification. Preferably, no modifications to either the hardware or the software of said host computer are required.

The local extender is preferably a self-contained unit that connects to said host computer through a standard USB cable.

The remote extender is preferably a self-contained unit that connects to said plurality of USB peripheral devices through a plurality of standard USB cables.

The data communications network is not limited to any particular transmission media or protocol, but can, in operation, introduce a round-trip transmission delay between said host computer and said plurality of USB peripheral devices in excess of 1 microsecond. It is a necessary attribute of said data communications network that it provide a communications path between at least one local extender unit and at least one remote extender unit. It is preferable that said data communications network provide a communications path between at least one local extender unit and a plurality of remote extender units (a point-to-multipoint configuration). Networks such as those based on wired Ethernet, wireless Ethernet, IEEE 802.15.3, and the Internet are, for example, compliant with these requirements.

The methods and apparatuses of the present invention are most preferably used in a system wherein said host computer is a personal computer, and said plurality of USB peripheral devices are comprised of USB flash drives, USB hard drives, USB CD/DVD drives, USB cameras, USB mice, USB keyboards, USB hubs or any other device which is compatible with the USB Specification.

In a preferred embodiment of a local extender unit, the local extender includes an upstream transceiver and a downstream transceiver, and the upstream transceiver is a standard USB transceiver and the downstream transceiver is a wireless transceiver.

In a further preferred embodiment of a local extender unit, the upstream transceiver is a standard USB transceiver and the downstream transceiver is an Ethernet transceiver.

In a preferred embodiment of a remote extender unit, the remote extender includes an upstream transceiver and a downstream transceiver, and the upstream transceiver is a wireless transceiver and the downstream transceiver is a standard USB transceiver.

In a further preferred embodiment of a remote extender unit, the upstream transceiver is an Ethernet transceiver and the downstream transceiver is a standard USB transceiver.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which:

FIG. 10 is a table recording the topology of a system configured according to the invention;

DETAILED DESCRIPTION OF THE INVENTION

Figure 1:
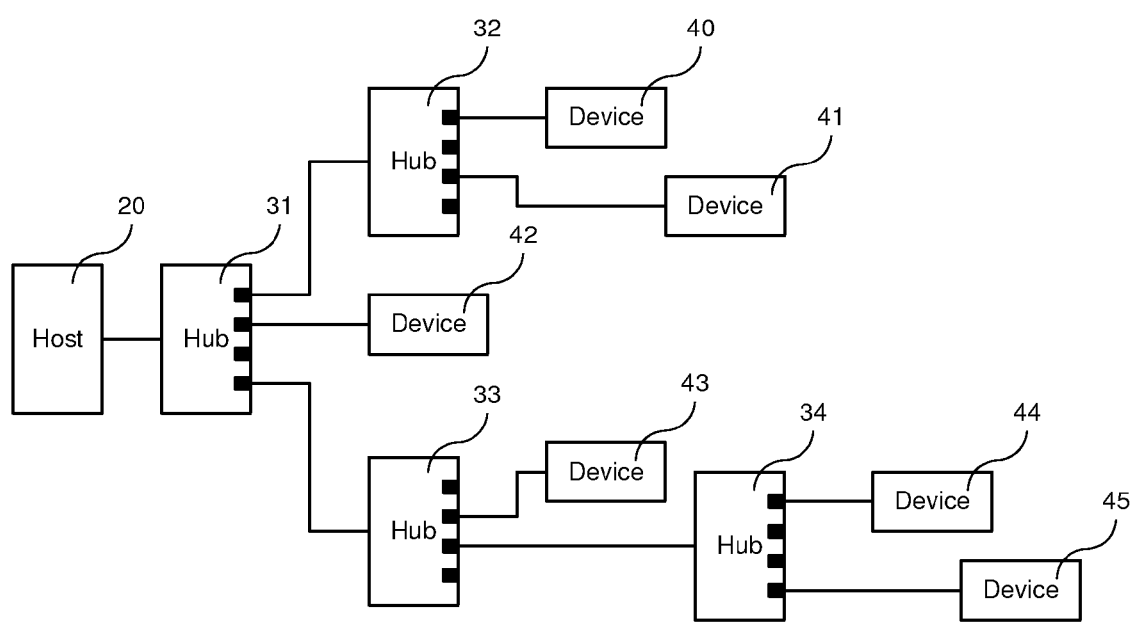
FIG. 1 is a block diagram of a typical system topology according to the USB specification.

FIG. 1 is a block diagram of a prior art system assembled according to the USB Specifications. According to the USB Specifications, a USB-enabled computer (20) may be connected to a plurality of USB devices (40-45) through a USB hub (31) and through a chain of USB hubs (31 and 32, and 31 to 34). A device cannot be connected to another device and the maximum number of hubs that can be connected in a single serial chain is five. The maximum length of each cable used to interconnect a computer, hub or device is 5 meters.

Figure 2:
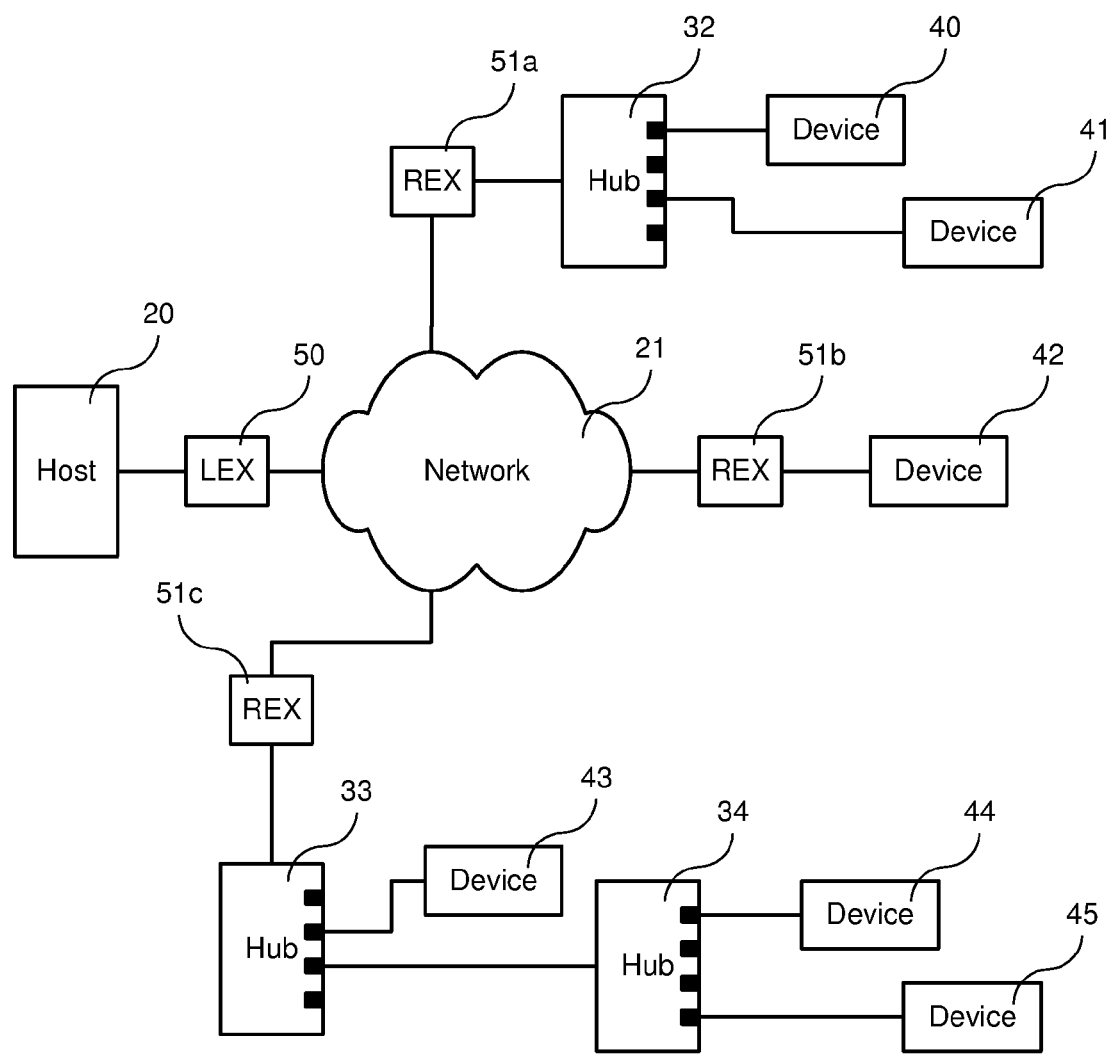
FIG. 2 is a block diagram of a corresponding system topology according to the invention.

FIG. 2 is a block diagram of a system for communicating with USB devices across a network, according to the present invention.

In this arrangement, USB subactions, including input/output operations for host computer (20) are intercepted by a local extender (50) which is connected to said host computer through a standard USB cable. The local extender (50) preferably generates a "modified" form of the USB protocol that is delivered over network (21) to a plurality of remote extenders (51a, 51b, 51c) which can be located at an extended distance from said local extender (50). Hubs 32, and 33, and device 42 are connected to remote extenders 51a, 51b, and 51c, as previously described.

In this embodiment of the present invention, a host computer (20), and a local extender (50) are assembled as individual units. It will be apparent to those skilled in the art though that different combinations of these components might be used and that alternative packaging arrangements are possible.

Each remote extender (51a, 51b, 51c) receives signals from the network (21) and then, if necessary, preferably converts the received signals to electrical signals compatible with the USB protocol and delivers these electrical signals over USB cables to directly connected USB hubs (32, 33) and USB peripheral device (42). Signals are relayed to indirectly connected USB peripheral devices (40, 41, 43, 44, 45) and to indirectly connected USB hub (34) by USB hubs (32, 33). The reverse process occurs when signals are passed from USB peripheral devices (40-45) to host computer (20).

Again, in this embodiment of the present invention, a remote extender (51b) and a USB peripheral device (42) are assembled as individual units. It will be apparent to those skilled in the art though that different combinations of these components might be used and that alternative packaging arrangements are possible.

Also, in this embodiment of the present invention, a remote extender (51a) and a USB hub (32) are assembled as individual units. It will again be apparent to those skilled in the art that different combinations of these components might be used and that alternative packaging arrangements are possible.

Further, in this embodiment of the present invention, a particular arrangement of three remote extenders, three remote hubs and six USB peripheral devices has been chosen. It will clearly be apparent to those skilled in the art that different populations of these hubs and devices might be used and that alternative connection arrangements are possible.

In this embodiment of the present invention, the data communications network (21) is a wired Ethernet network and the round-trip delay between host computer (20) and USB peripheral device (42) can be up to, for example, 1 millisecond or more. In other embodiments, however, the data communications network can be changed. For example, in another embodiment of the invention, the data communications network (21) can be a wireless network and the round-trip delay between host computer (20) and USB peripheral device (42) can be up to, for example, 100 milliseconds or more. In a further embodiment of the invention, the data communications network (21) can be an internet connection and the round-trip delay between host computer (20) and USB peripheral device (42) can be up to, for example, 1 second or more.

As such, it will be apparent to those skilled in the art that different data communications networks might be used, and that the corresponding round-trip delays may change accordingly.

Figure 3:
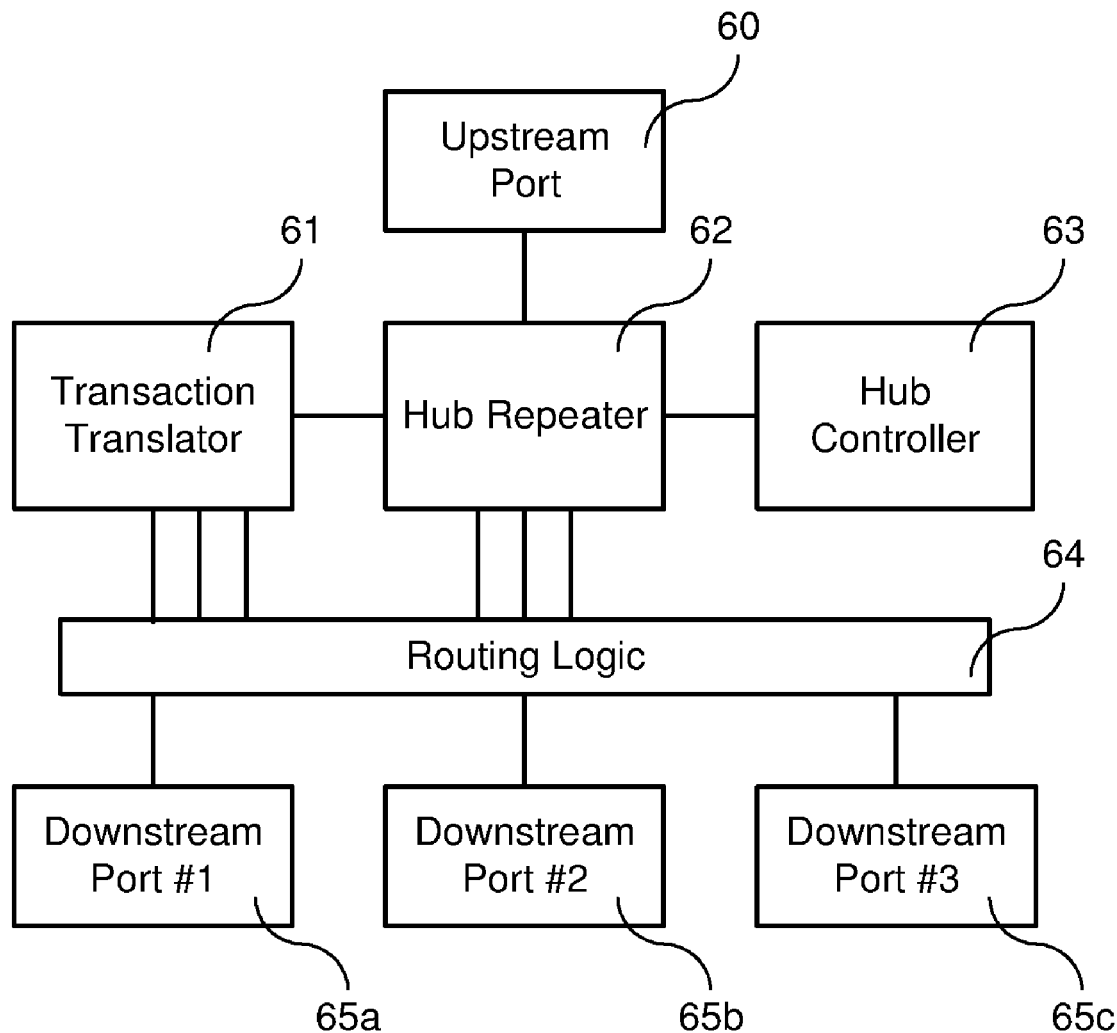
FIG. 3 is a block diagram of a hub according to the USB specification.

FIG. 3 is a block diagram of a prior art USB hub assembled according to the USB specification. Said USB hub is equipped with an upstream port (60) for communicating with a host computer or upstream hub, and a plurality of downstream ports (65a, 65b, 65c) for communicating with a plurality of USB devices or downstream USB hubs.

A USB subaction arriving at upstream port (60) is forwarded to hub repeater (62) which determines whether said USB subaction can be forwarded directly to one of the downstream ports (65a, 65b, 65c) or must be directed towards transaction translator (61) or hub controller (63). A USB subaction that must be converted from high-speed format to classic-speed format is directed towards transaction translator (61). A USB subaction that relates to the internal operation of the hub is directed towards hub controller (63). A USB subaction that relates to the status of the USB peripheral devices that are directly connected to downstream ports (65a, 65b, 65c) is directed towards hub controller (63).

A USB subaction that arrives at transaction translator (61) from hub repeater (62) is converted from high-speed to classic-speed format by said transaction translator (61) and then forwarded to the appropriate downstream port (65a, 65b or 65c) through routing logic (64).

In the upstream direction, a high-speed USB subaction arriving at any downstream port (65a, 65b or 65c) is forwarded by routing logic (64) to hub repeater (62) which in turn forwards said high-speed USB subaction to upstream port (60). A classic-speed USB subaction arriving at downstream port (65a, 65b or 65c) is forwarded by routing logic (64) to transaction translator (61) where said classic-speed USB subaction is converted to high-speed USB format before being forwarded to hub repeater (62) and thereafter to upstream port (60).

The number of upstream ports is typically one, but the number of downstream ports can vary from 1 to 255, and is not limited to the three ports shown.

Figure 4:
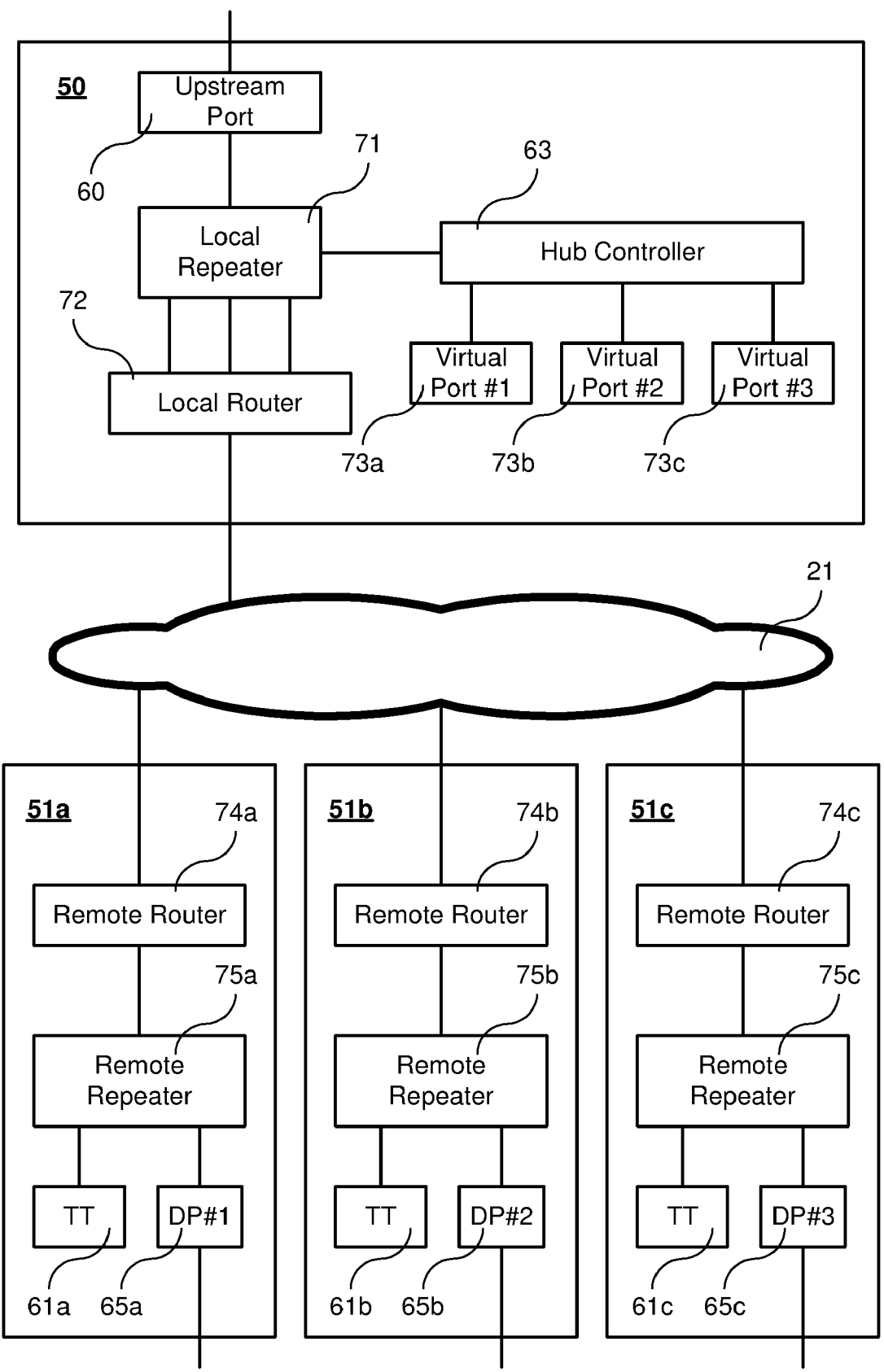
FIG. 4 is a block diagram showing the distribution of USB hub functions across a network according to the invention.

FIG. 4 is a block diagram showing the distribution of USB hub functions across a network according to the present invention. The following description will describe the operation of the invention with respect to remote extender (51b) for illustration of the method but it will be clear to those skilled in the art that a similar description applies to remote extenders (51a) and (51c) and that additional remote extenders may be deployed beyond the three units shown in FIG. 4, up to the maximum number of ports allowed for a USB hub (e.g. currently to a maximum of 255 ports).

In this arrangement of the present invention, the upstream port (60) and hub controller (63) are located within the local extender (50). The hub repeater function (62) from FIG. 3 for providing connectivity between the remaining hub functions, is duplicated as a local repeater (71) within local extender (50), and as a remote repeater (75b) in remote extender (51b).

The transaction translator (61) from FIG. 3 is located within remote extender (51b) as transaction translator (61b). The downstream port (65b) from FIG. 3 is located within remote extender (51b) as downstream port (65b).

The routing logic (64) from FIG. 3 is replaced by a local router (72) in local extender (50) and a remote router (74b) in remote extender (51b). Whereas in a conventional USB hub, routing logic (64) is required to direct traffic to a specific port (65a, 65b or 65c), in the present invention the replacement logic (72 and 74b) is required to direct traffic to a specific network node that identifies remote extenders (51a, 51b or 51c) or local extender (50).

The functionality of hub controller (63) is enhanced by the addition of virtual ports (73a, 73b, 73c), wherein said virtual ports provide to said hub controller (63) a local mechanism for maintaining the status of physical downstream ports (65a, 65b, 65c). In this arrangement, each local virtual port (e.g. 73b) provides local emulation of its corresponding remote physical port (e.g. 65b), enabling hub controller (63) to operate on a local resource (73b) while said virtual port (73b) is responsible for relaying operations to remote physical port (65b). A similar process occurs in the opposite direction when a physical event occurring at remote physical port (65b) is relayed to corresponding local virtual port (73b) and said local virtual port (73b) is then responsible for informing hub controller (63) of said physical event.

Figure 5:
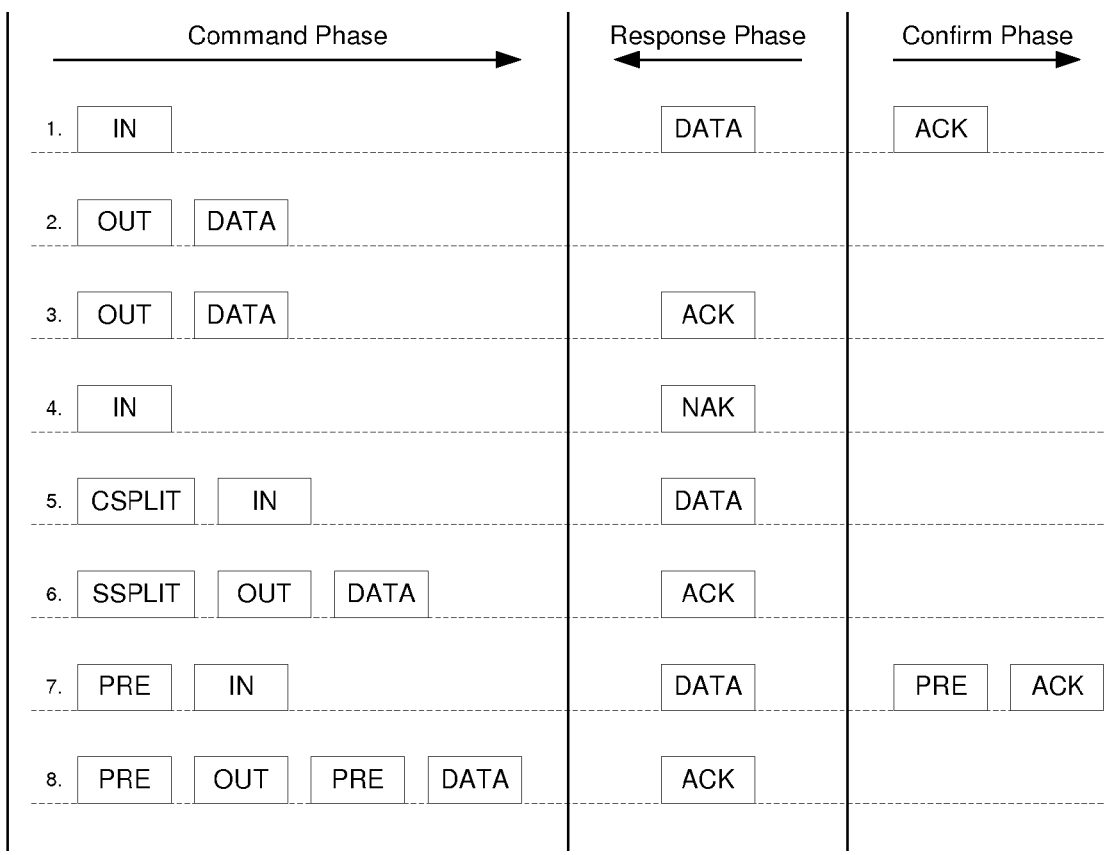
FIG. 5 is a timing diagram of typical USB transactions according to the prior art USB Specifications.

FIG. 5 is a timing diagram of typical USB transactions according to the prior art USB Specifications.

A USB transaction consists of one, two or three phases, in which a phase is terminated by a reversal in the direction of data flow. Each phase can contain zero, one or more discrete USB packets. The set of packets that comprise a single phase is described herein as a USB subaction.

In the examples shown in FIG. 5, transaction #1 occupies three phases and is an example of an IN command addressed to an asynchronous endpoint. Transaction #2 occupies one phase and is an example of an OUT command addressed to an isochronous endpoint. Transactions #3, #6 and #8 occupy two phases and are examples of OUT commands addressed to asynchronous endpoints.

Additional transactions #4 and #5 also occupy two phases and are further examples of IN commands addressed to asynchronous endpoints. Transaction #7 occupies three phases and is an example of an IN command addressed to a low-speed asynchronous endpoint.

Figure 6:
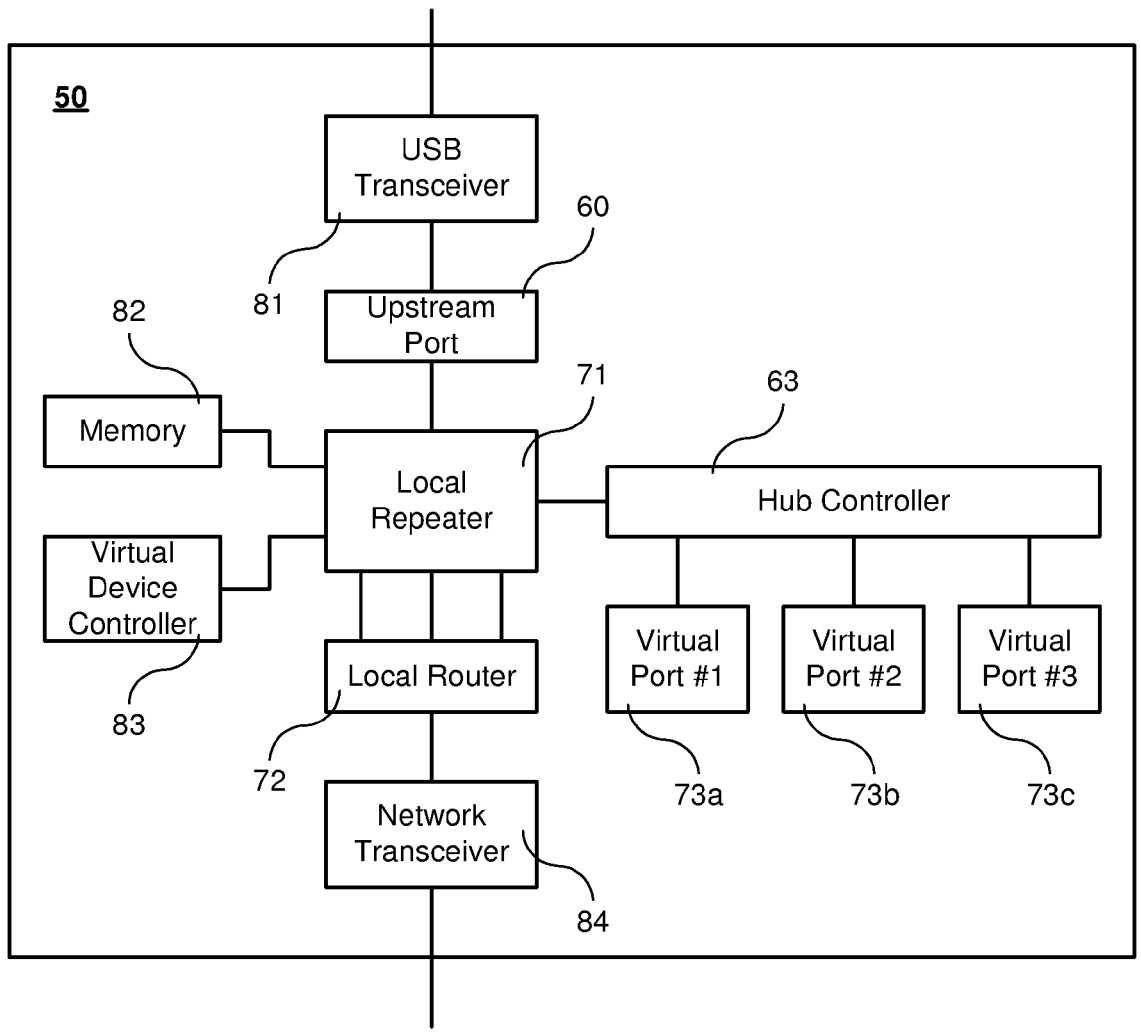
FIG. 6 is a block diagram of a local extender unit according to the invention.

FIG. 6 is an enhanced block diagram of a local extender unit (50) according to the invention. A particular enhancement included in said local extender unit (50) is the addition of virtual device controller (83). Said virtual device controller (83) can be configured to emulate the operation of a physical USB device or devices and can thereby be used to add value-added features to said local extender unit (50). In one embodiment of the present invention said virtual device controller (83) emulates a radio management function and can be used to control the physical parameters of network transceiver (84). In another embodiment of the present invention said virtual device controller (83) emulates a network interface card and can be used to transmit TCP/IP packets across data communications network (21). It will be apparent to those skilled in the art that these functions are not unique and that other functions may be performed in a similar manner.

In a first mode of operation, a USB subaction originating from host computer (20) is received by USB transceiver (81) and forwarded through upstream port (60) to local repeater (71). The content of said USB subaction is examined by local repeater (71) and forwarded as required.

If said USB subaction is addressed to virtual USB hub (31), then said USB subaction is forwarded to hub controller (63). If said USB subaction is addressed to a USB peripheral device (40-45) or physical USB hub (32-34), then said USB subaction is forwarded to local router (72). If said USB subaction is addressed to a virtual USB device, then said USB subaction is forwarded to virtual device controller (83).

If a response to said USB subaction is already present in local memory (82), as described herein below, then said response is retrieved from memory by local repeater (71) and forwarded to USB transceiver (81) through upstream port (60). If a synthetic response to said USB subaction is required, then said synthetic response is generated by local repeater (71) and forwarded to USB transceiver (81) through upstream port (60).

When a USB subaction is forwarded by local repeater (71) to local router (72), the USB address contained in said USB command is examined by said local router (72) and translated to a network address. Said local router (72) encapsulates said USB subaction in a network packet, addresses said network packet with said translated network address and forwards said addressed network packet to network transceiver (84) for transmission across said network (21) to remote extender (51*b*).

In a second mode of operation, an addressed network packet from said remote extender (51*b*) is received by network transceiver (84) and forwarded to local router (72). Said local router (72) extracts a USB subaction from said addressed network packet, examines the content of said USB subaction, and forwards said USB subaction to local repeater (71). If said content represents a USB response subaction, then said USB response subaction is stored in local memory (82) for later transmission to the USB transceiver, as discussed hereinabove, in response to a USB command subaction. If said content represents a system subaction indicating a change in status of USB device (42) directly connected to said remote extender (51*b*), then said system subaction is forwarded to hub controller (63). Hub controller (63) examines the content of said forwarded system subaction and updates the status of virtual port #2 (73*b*).

Figure 7:
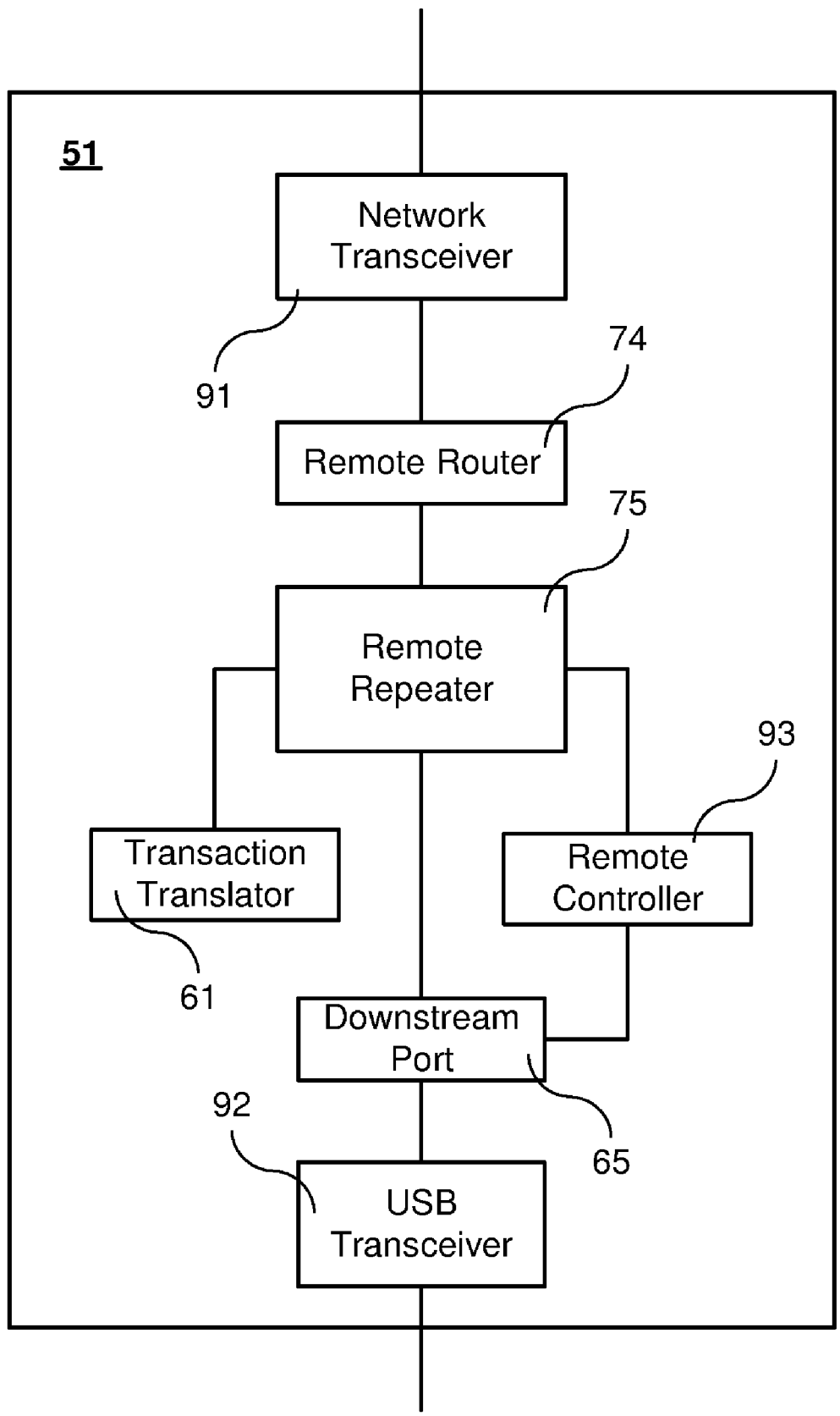
FIG. 7 is a block diagram of a remote extender unit according to the invention.

FIG. 7 is an enhanced block diagram of a remote extender unit (51) according to the invention. In this arrangement, the operation of said remote extender unit (51) is activated by a stimulus occurring at either network transceiver (91) or USB transceiver (92). Where a specific scenario is required, the following description will use remote extender (51*b*) for illustration of the method but it will be clear to those skilled in the art that a similar description applies to remote extenders (51*a*) and (51*c*) and that additional remote extenders may be deployed beyond the three units shown in FIG. 4.

In accordance with the USB specifications, transactions that require the use of a transaction translator are described as split transactions. Accordingly, transactions that do not require the use of said transaction translator will be described herein as atomic transactions.

In a first mode of operation, an addressed network packet is received by network transceiver (91) and forwarded to remote router (74). Said remote router (74) extracts a USB subaction from said addressed network packet, examines the content of said USB subaction, and forwards said USB subaction to remote repeater (75). If said content represents a USB subaction indicating a split transaction, then said USB subaction is forwarded to transaction translator (61). If said content represents a USB subaction indicating an atomic (non-split) USB transaction, then said USB subaction is forwarded to USB transceiver (92) through downstream port controller (65). If said content represents a system subaction, then said system subaction is forwarded to remote controller (93).

In a second mode of operation, a USB subaction is received from USB peripheral device (42) by USB transceiver (92) and forwarded through downstream port controller (65) to remote repeater (75). Said remote repeater (75) examines the content of said USB subaction and optionally generates a USB confirm subaction for transmission to said USB peripheral device (42) through downstream port controller (65) and USB transceiver (92). Also, if said content of said USB subaction indicates an atomic USB transaction, then said USB subaction is forwarded to remote router (74). Further, if said content of said USB subaction indicates a classic-speed USB transaction, then said USB subaction is forwarded to transaction translator (61) for conversion to high-speed split transaction format. Said converted USB subaction is then forwarded through remote repeater (75) to remote router (74).

When remote router (74) receives a USB subaction from remote repeater (75), said remote router (74) encapsulates said USB subaction in a network packet, addresses said network packet with the network address of local extender (50) and forwards said addressed network packet to network transceiver (91) for transmission over data communications network (21).

In a third mode of operation, a change in the status of USB peripheral device (42) is detected by downstream port controller (65) through USB transceiver (92) and reported to remote controller (93). In response to said reported change in status, said remote controller generates a system subaction and forwards said system subaction to remote repeater (75) for transmission to local extender (50).

Figure 8:
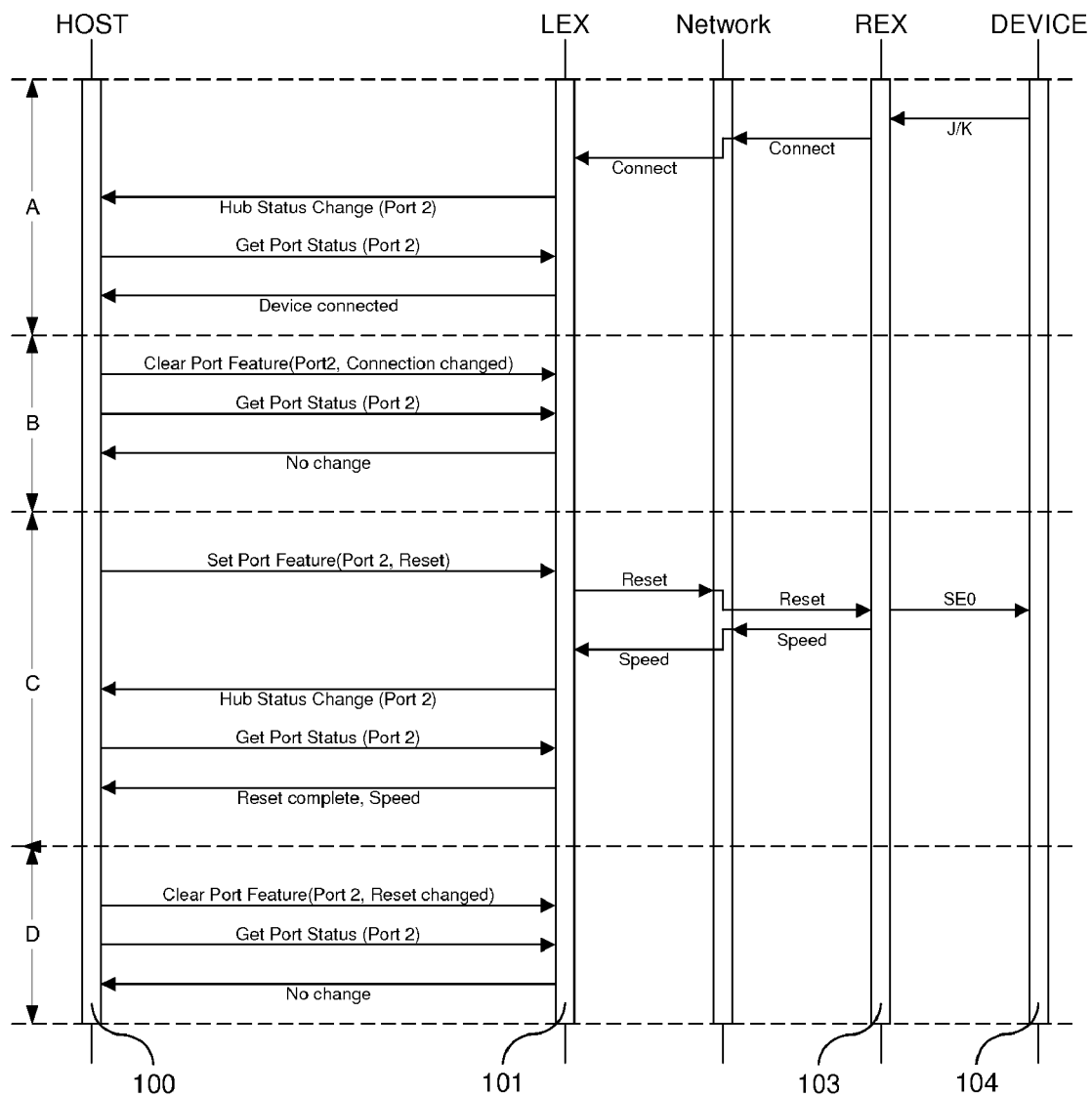
FIG. 8 is a sequence diagram showing the handling of a connect event according to the invention.

FIG. 8 is a sequence diagram showing the handling of a connect event according to the invention. The presentation format used in the diagram is attributable to Jacobson et al. (Ivar Jacobson, Magnus Christerson, Patrick Jonsson and Gunnar Overgaard, Object-Oriented Software Engineering: A Use Case Driven Approach, Addison-Wesley, 1992.). For illustration purposes, it will be assumed that said sequence diagram describes the attachment of USB peripheral device (42) to remote extender (51*b*), and that remote extender (51*b*) is assigned to virtual port #2 (73*b*) on hub controller (63). It will be apparent to those skilled in the art that the same process can be applied to the attachment of any USB peripheral device or any USB hub to any remote extender and that further virtual ports can be assigned as required.

The connection sequence begins in section "A". On power-up, in accordance with standard USB protocols, control logic (104) in USB peripheral device (42) drives a static J/K value on its USB data lines. Said static J/K value is detected by control logic (103) in remote extender (51*b*) and transmitted as a connect subaction across network (21) to local extender (50). Control logic (101) in local extender (50) updates the status of the corresponding virtual port (73*b*) and reports said change of status event to host computer (20).

Control logic (100) in host computer (20) then requests the status of port #2, and control logic (101) in local extender (50) replies with a device connected indication.

Subsequently, in section "B", control logic (100) in host computer (20) issues a command to clear the change in connection status indicator belonging to port #2, and then requests confirmation that said command has been completed by issuing a further request for the status of port #2. Control logic (101) in local extender (50) clears said change in connection status indicator belonging to port #2, and reports that no further changes in status are outstanding. This operation completes the physical attachment sequence.

Thereafter, in section "C", control logic (100) in host computer (20) initiates a device reset sequence by generating a USB command to reset the device attached to port #2. Control logic (101) in local extender (50) translates said USB command into a reset subaction and transmits said reset subaction across network (21) to remote extender (51*b*). Control logic (103) in remote extender (51*b*) receives said transmitted reset subaction and drives a reset condition (SE0) on the data lines of downstream port (65b). After transmitting the reset condition for a period of time determined by the USB specification, said remote extender (51b) establishes the speed of operation of said USB peripheral device (42), and transmits said speed of operation as a speed subaction across network (21) to said local extender (50). Control logic (101) in local extender (50) updates the status of the corresponding virtual port and reports said change of status event to host computer (20).

Control logic (100) in host computer (20) then requests the status of port #2, and control logic (101) in local extender (50) replies with a reset complete plus speed indication.

Subsequently, in section "D", control logic (100) in host computer (20) issues a command to clear the change in reset status indicator belonging to port #2, and then requests confirmation that said command has been completed by issuing a further request for the status of port #2. Control logic (101) in local extender (50) clears said change in reset status indicator belonging to virtual port #2 (73b), and reports that no further changes in status are outstanding. This operation completes the device reset sequence.

Figure 9:
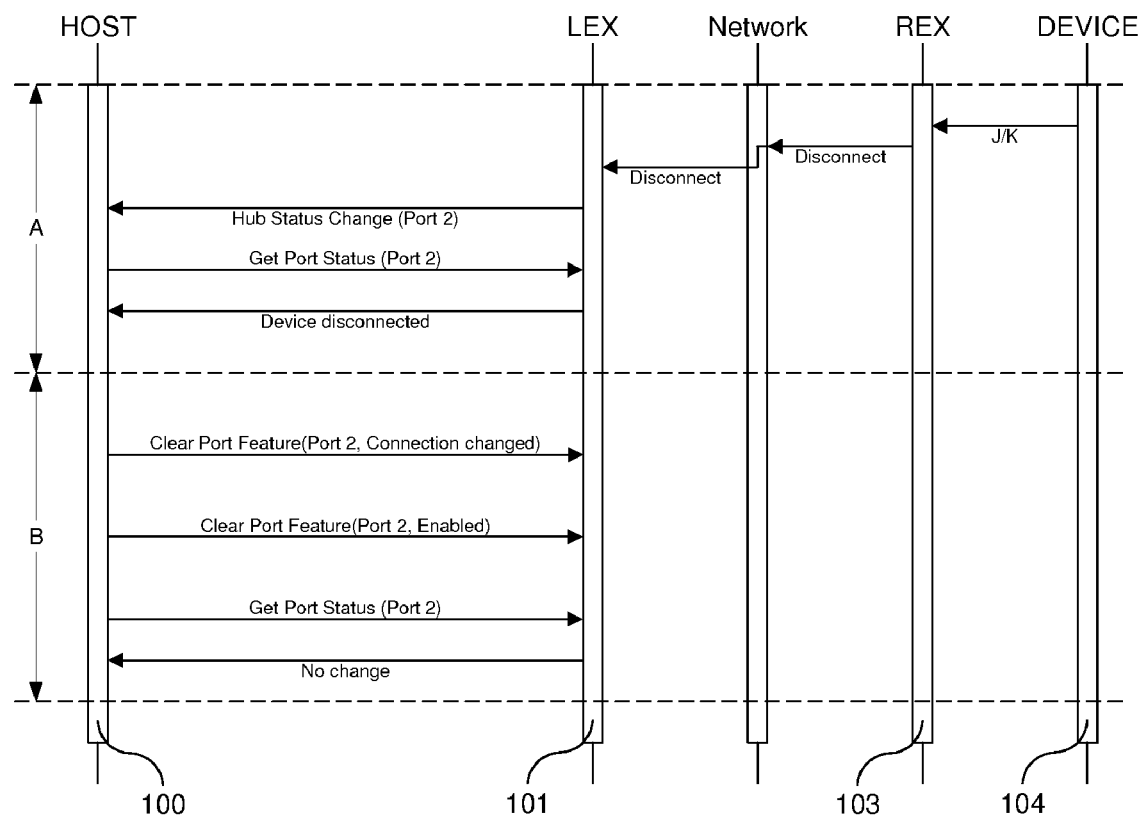
FIG. 9 is a sequence diagram showing the handling of a disconnect event according to the invention.

FIG. 9 is a sequence diagram showing the handling of a disconnect event according to the invention. For illustration purposes, it will be assumed that said sequence diagram describes the detachment of USB peripheral device (42) from remote extender (51b), and that remote extender (51b) is assigned to virtual port #2 (73b) on hub controller (63). It will be apparent to those skilled in the art that the same process can be applied to the detachment of any USB peripheral device or any USB hub from any remote extender and that further virtual ports can be assigned as required.

The disconnection sequence begins in section "A". On device detachment, control logic (104) in USB peripheral device (42) ceases to drive a static J/K value on its USB data lines. Said cessation of driving a static J/K value is detected by control logic (103) in remote extender (51b) and transmitted as a disconnect subaction across network (21) to local extender (50). Control logic (101) in local extender (50) updates the status of the corresponding virtual port and reports said change of status event to host computer (20).

Control logic (100) in host computer (20) then requests the status of port #2, and control logic (101) in local extender (50) replies with a device disconnected indication.

Subsequently, in section "B", control logic (100) in host computer (20) issues a command to clear the change in connection status indicator belonging to port #2, and then issues a further command to clear the enabled status of port #2. Control logic (100) in host computer (20) then requests confirmation that said commands have been completed by issuing a further request for the status of port #2. Control logic (101) in local extender (50) clears said change in connection status indicator and said enabled status belonging to virtual port #2 (73b), and reports that no further changes in status are outstanding. This operation completes the physical detachment sequence.

FIG. 10 is a table recording the topology of a system configured according to the invention.

The data presented in said table provides a method by which the example topology presented in FIG. 2 can be mapped. In turn, the topology of the current invention illustrated in FIG. 2 is required to emulate the topology of the prior art system illustrated in FIG. 1. The device column records the USB address of each device and hub contained in FIG. 2. For clarity, the USB address is set identical to the numbering of the blocks in FIG. 2. It will be apparent to those skilled in the art that this association is not essential and that any USB address in the range 1-127 may be allocated by host computer (20).

A special case is presented by USB hub (31). In FIG. 1, said USB hub (31) is a physical unit and is allocated USB address 31. In FIG. 2, said USB hub is a virtual unit created by the combined operations of local extender (50), remote extenders (51a, 51b and 51c) and network (21). In order to emulate the operation of said physical USB hub (31), said virtual hub is also allocated USB address 31.

The parent/address column records the USB address of the upstream hub to which a device or hub is connected. The parent/port column records the port number of the upstream hub to which a device or hub is connected. The child/port # columns record the USB address of the downstream device or hub connected to said port number. The number of child/port # columns shown in the table is four which enables a maximum of four remote extender units to be incorporated in the system. It will be apparent to those skilled in the art that this value is not unique and that currently any value in the range from 1 to 255 can be chosen, thereby enabling the maximum number of remote extender units to also fall within the range 1 to 255.

The network address column records the network address of the network node to which a device or hub is directly connected.

The operation of said table will be further described by selecting particular examples. A special case is presented by USB hub (31) which is connected to host computer (20) and acts as the root of the USB topology. In FIG. 2, said USB hub (31) is implemented as a virtual hub by the functions distributed in extenders (50, 51a, 51b and 51c) and in particular by hub controller (63) in local extender (50). Said USB hub (31) appears as device (31) in said table. Since USB hub (31) forms the root of the system it has no parent within the system and the value of its parent address and port number is set to null. The child entries for said USB hub (31) show that USB hub (32) is connected to its port #1, USB peripheral device (42) is connected to its port #2 and USB hub (33) is connected to its port #4. The network entry for said USB hub (31) shows that it is connected to network node (N0). It will be apparent to those skilled in the art that value (N0) is representational and that any other value may be used that is appropriate to the network chosen to provide data communications between said local and remote extenders. For example, if said data communications network is an Ethernet network then said network entry would be an Ethernet address. If said data communications network is an Internet network then said network entry would be an IP address.

The entry for USB hub (34) in said table shows that its parent is port #3 on USB hub (33), that USB peripheral device (44) is connected to its port #1, that USB peripheral device (45) is connected to its port #4, and that said USB hub (34) is not directly connected to network (21). The network address to be used for USB hub (34) is then found by tracing its connectivity back through its parent or parent's parent. In the case of USB hub (34), its parent is USB hub (33) and the network address of said USB hub (33) is (N3). In this manner, the chaining of USB hubs according to the USB Specification is accommodated by the present invention.

The entry for USB peripheral device (42) shows that its parent is port #2 on USB hub (31) and that it is directly connected to network (21) at node (N2).

Figure 11:
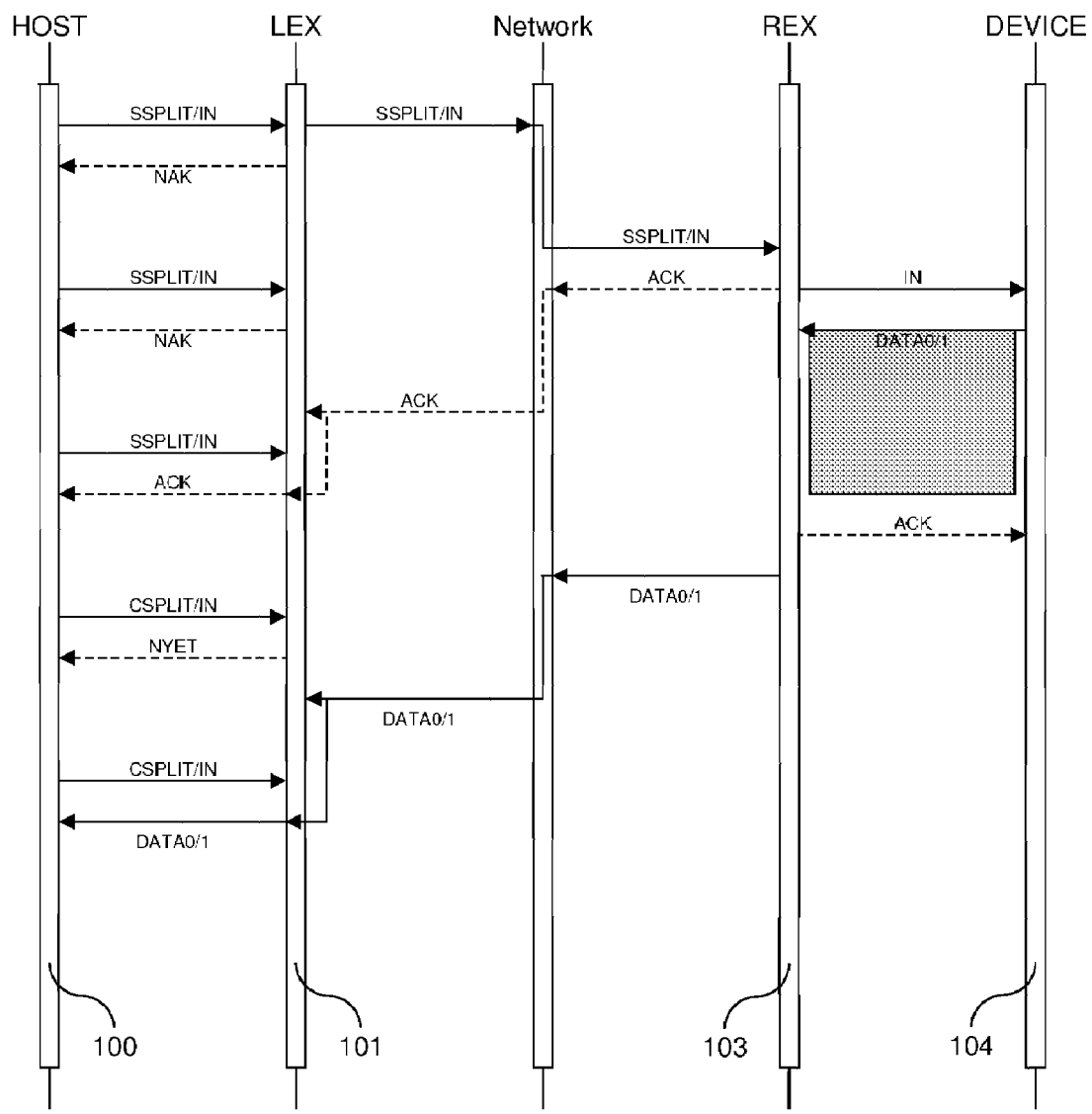
FIG. 11 is a sequence diagram showing the handling of a split asynchronous IN transaction according to the invention.

FIG. 11 is a sequence diagram showing the handling of a split asynchronous IN transaction according to the invention.

Control logic (100) in host computer (20) initiates said transaction by issuing a first start-split IN command to local extender (50). Control logic (101) responds to said first start-split IN command by transmitting a negative response subaction to said host computer (20), and then forwards said first start-split IN command to remote extender (51b) across network (21). Control logic (101) continues to generate negative response subactions whenever a subsequent start-split IN command is received from host computer (20) and no response has been received from remote extender (51b).

Control logic (103) in remote extender (51b) receives said first start-split IN command from network (21), converts said start-split IN command into a classic-speed IN command, and then forwards said classic-speed IN command to USB peripheral device (42). Also, control logic (103) in remote extender (51b) transmits a positive response subaction across network (21) to local extender (50) where said positive response subaction is stored in local memory. When control logic (100) in host computer (20) issues a further start-split IN command, control logic (101) in local extender (50) retrieves said positive response subaction from local memory and forwards said retrieved positive response subaction to host computer (20). Control logic (100) in host computer (20) then issues a complete-split IN command and control logic (101) in local extender (50) replies with a not-yet response.

Meanwhile, control logic (104) in USB peripheral device (42) generates a classic-speed DATA0/1 response and forwards said response to remote extender (51b). Control logic (103) in remote extender (51b) generates a classic-speed confirm subaction and forwards said subaction to USB peripheral device (42). Also, control logic (103) in remote extender (51b) forwards said DATA0/1 response across network (21) to local extender (50) where said DATA0/1 response subaction is stored in local memory. When control logic (100) in host computer (20) issues a further complete-split IN command, control logic (101) in local extender (50) retrieves said DATA0/1 response subaction from local memory and forwards said retrieved DATA0/1 response subaction to host computer (20).

Figure 12:
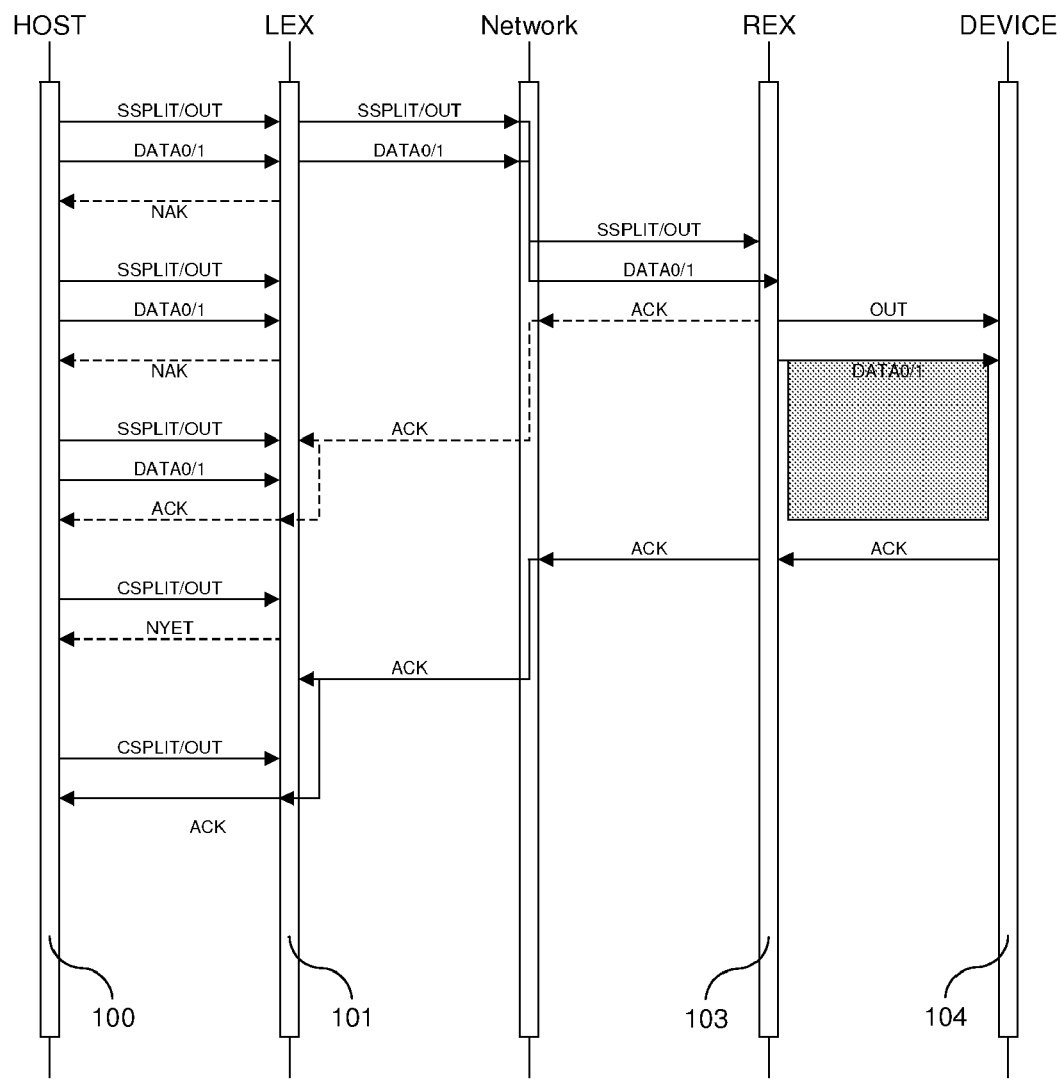
FIG. 12 is a sequence diagram showing the handling of a split asynchronous OUT transaction according to the invention.

FIG. 12 is a sequence diagram showing the handling of a split asynchronous OUT transaction according to the invention.

Control logic (100) in host computer (20) initiates said transaction by issuing a first start-split OUT/DATA0/1 command to local extender (50). Control logic (101) responds to said first start-split OUT/DATA0/1 command by transmitting a negative response subaction to said host computer (20), and then forwards said first start-split OUT/DATA0/1 command to remote extender (51b) across network (21). Control logic (101) continues to generate negative response subactions whenever a subsequent start-split OUT/DATA0/1 command is received from host computer (20) and no response has been received from remote extender (51b).

Control logic (103) in remote extender (51b) receives said first start-split OUT/DATA0/1 command from network (21), converts said start-split OUT/DATA0/1 command into a classic-speed OUT/DATA0/1 command, and then forwards said classic-speed OUT/DATA0/1 command to USB peripheral device (42). Also, control logic (103) in remote extender (51b) transmits a positive response subaction across network (21) to local extender (50) where said positive response subaction is stored in local memory. When control logic (100) in host computer (20) issues a further start-split OUT/DATA0/1 command, control logic (101) in local extender (50) retrieves said positive response subaction from local memory and forwards said retrieved positive response subaction to host computer (20). Control logic (100) in host computer (20) then issues a complete-split OUT command and control logic (101) in local extender (50) replies with a not-yet response.

Meanwhile, control logic (104) in USB peripheral device (42) generates a classic-speed positive response subaction and forwards said subaction to remote extender (51b). Control logic (103) in remote extender (51b) forwards said positive response subaction across network (21) to local extender (50) where said positive response subaction is stored in local memory. When control logic (100) in host computer (20) issues a further complete-split OUT command, control logic (101) in local extender (50) retrieves said positive response subaction from local memory and forwards said retrieved positive response subaction to host computer (20).

Figure 13:
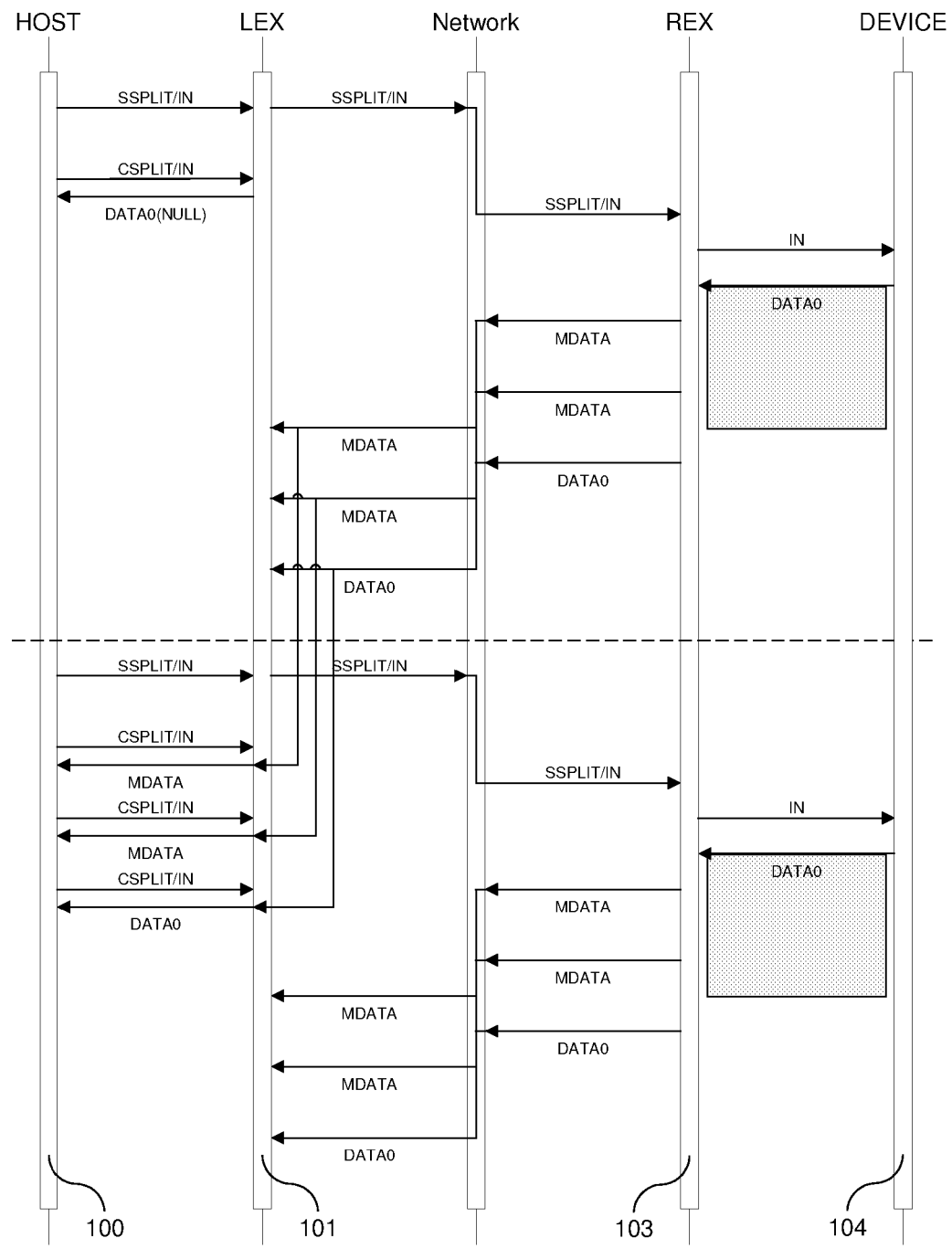
FIG. 13 is a sequence diagram showing the handling of a split isochronous IN transaction according to the invention.

FIG. 13 is a sequence diagram showing the handling of a split isochronous IN transaction according to the invention.

Control logic (100) in host computer (20) initiates said transaction by issuing a first start-split IN command to local extender (50). Control logic (101) in local extender (50) forwards said first start-split IN command to remote extender (51b) across network (21). Control logic (103) in remote extender (51b) receives said first start-split IN command from network (21), converts said start-split IN command into a classic-speed IN command, and then forwards said classic-speed IN command to USB peripheral device (42). After a delay, control logic (100) in host computer (20) transmits a complete-split IN command to local extender (50) and control logic (101) in local extender (50) replies with a null-data response. Control logic (101) continues to generate null-data responses whenever a subsequent complete-split IN command is received from host computer (20) and a DATA0 response has not been received from remote extender (51b).

Meanwhile, control logic (104) in USB peripheral device (42) generates a classic-speed DATA0 response and forwards said response to remote extender (51b). Control logic (103) in remote extender (51b) converts said classic-speed DATA0 response into a sequence of high-speed MDATA/DATA0 responses and forwards said responses across network (21) to local extender (50) where said MDATA/DATA0 responses are stored in local memory. When control logic (100) in host computer (20) issues a further sequence of complete-split IN commands, control logic (101) in local extender (50) retrieves said MDATA/DATA0 responses from local memory and forwards said retrieved MDATA/DATA0 responses to host computer (20).

Figure 14:
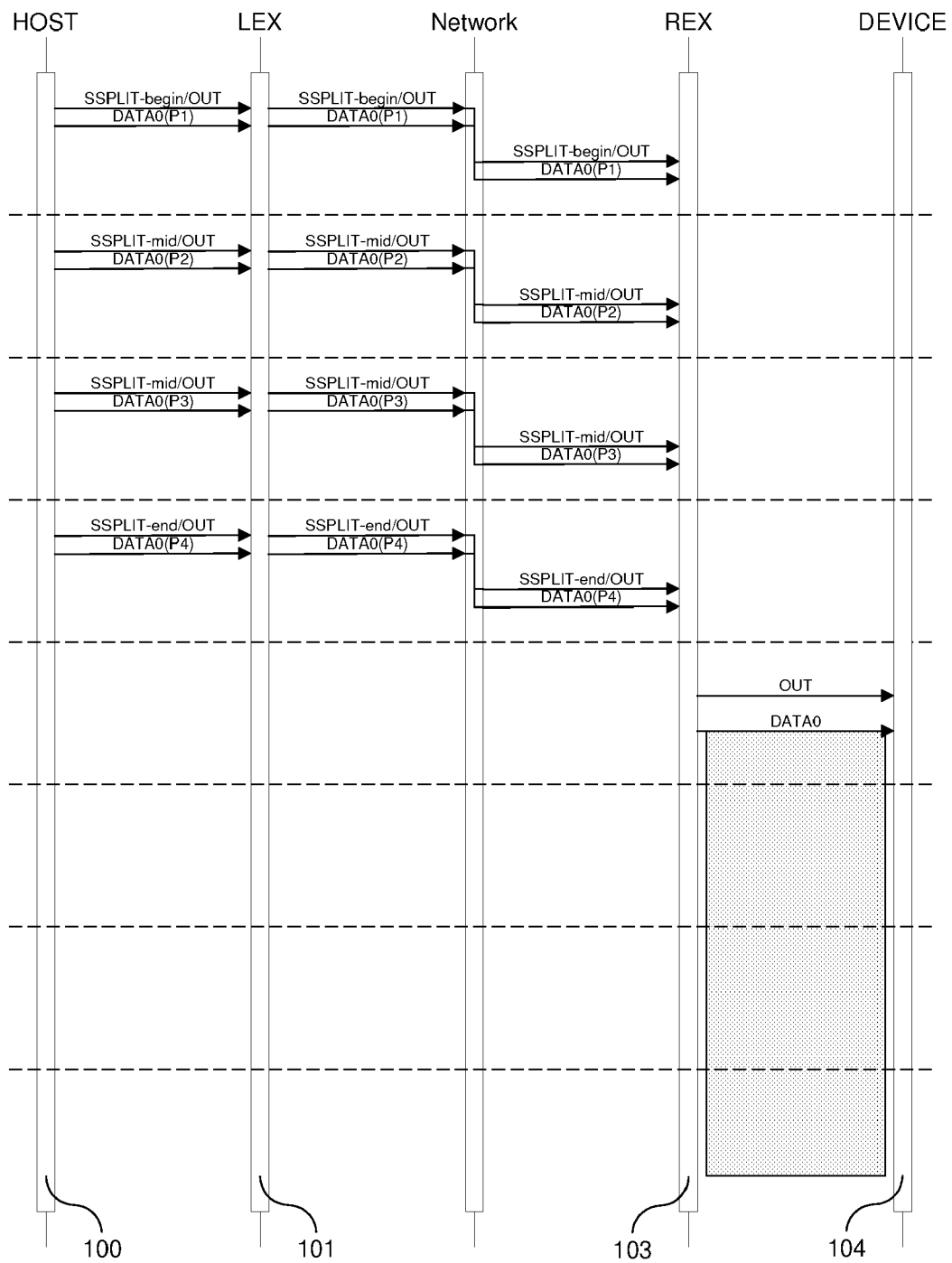
FIG. 14 is a sequence diagram showing the handling of a split isochronous OUT transaction according to the invention.

FIG. 14 is a sequence diagram showing the handling of a split isochronous OUT transaction according to the invention.

Control logic (100) in host computer (20) initiates said transaction by issuing a start-split-begin OUT/DATA0 command to local extender (50). Control logic (101) in local extender (50) forwards said start-split-begin OUT/DATA0 command to remote extender (51b) across network (21).

Control logic (100) in host computer (20) continues said transaction by issuing one or more start-split-mid OUT/DATA0 commands to local extender (50). Control logic (101) in local extender (50) forwards each start-split-mid OUT/DATA0 command to remote extender (51b) across network (21).

Control logic (100) in host computer (20) completes said transaction by issuing a start-split-end OUT/DATA0 command to local extender (50). Control logic (101) in local extender (50) forwards said start-split-end OUT/DATA0 command to remote extender (51b) across network (21).

When control logic (103) in remote extender (51b) receives said start-split-end OUT/DATA0 command, said control logic (103) assembles said start-split-begin OUT/DATA0 command, said one or more start-split-mid OUT/DATA0 commands and said start-split-end OUT/DATA0 command into a classic-speed OUT/DATA0 command and forwards said command to USB peripheral device (42).

Thus, it is apparent that there has been provided, in accordance with the present invention, methods, systems and/or USB-related devices which fully, or at least partially, satisfy the means, objects, and advantages over the prior art as set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps.

The invention claimed is:

1. A method for transmitting data between a host computer and one or a plurality of USB peripheral devices, wherein said USB peripheral devices are distributed around a data communications network and wherein the transmission delay across said network is greater than that normally allowed by the USB specification, said method comprising connecting a host computer to a local extender device, connecting said local extender device to one or a plurality of remote extender devices through a data communication network, and connecting said remote extender devices to one or a plurality of USB peripheral devices, wherein signals between said host computer and said USB peripheral devices are saved, collected, absorbed, or otherwise processed in the local extender and/or the remote extenders so as to allow the host computer and the USB peripheral devices to operate in the presence of a round trip delay greater than that normally allowed in the USB specification, and wherein said method includes the ability to detect the attachment of a USB peripheral device to the system, to detect the detachment of a USB peripheral device, or includes the ability to determine the network address of a USB function wherein said USB function may be a USB hub or a USB peripheral device, and wherein said method provides for transmitting a USB command from a host computer, through a local extender, to a unique network address on a data communications network, which method comprises:

a) receiving at a local extender a USB command from a host computer;
b) extracting a first USB address from said USB command;
c) using said first USB address to access a first data record within a table of similar records;
d) determining whether said first data record contains a valid network address;
e) extracting from said first data record a second USB address identifying the upstream USB hub through which said first USB address may be accessed;
f) repeating steps (c) through (e) until a valid network address is found;
g) encapsulating said USB command in a network packet;
h) addressing said network packet to said valid network address; and
i) transmitting said addressed network packet to said data communications network.

2. A method as claimed in claim 1 which includes the ability to detect the attachment of a USB peripheral device by a host computer, wherein said host computer and said USB peripheral device conform to the requirements of the USB Specification, through a local extender and a remote extender, which method comprises:

a) detecting at said remote extender a device attachment event, having said remote extender send a device connect signal to said local extender, and then having said local extender update its local record of the change in connection status of said USB peripheral device and its local record of the connected status of said USB peripheral device;
b) receiving at said local extender a request from said host computer for device status change information and having said local extender inform said host computer that the status of said USB peripheral device has changed;
c) receiving at said local extender a request from said host computer for the status of said USB peripheral device and having said local extender provide said local record of the change in connection status and said local record of connected status to said host computer;
d) receiving at said local extender a request from said host computer to clear said change in connection status information and having said local extender clear said local record of the change in connection status information;
e) receiving at said local extender a further request from said host computer for the status of said USB peripheral device and having said local extender provide said cleared local record of the change in connection status and said local record of connected status to said host computer;
f) receiving at said local extender a command from said host computer to reset said USB peripheral device, having said local extender send a reset signal to said remote extender, and then having said remote extender perform a physical reset on said USB peripheral device;
g) detecting at said remote extender the transmission speed of said USB peripheral device, having said remote extender send a speed signal to said local extender, and then having said local extender update its local record of the transmission speed of said USB peripheral device and its local record of the change in reset status of said USB peripheral device;
h) receiving at said local extender a further request from said host computer for device status change information and having said local extender inform said host computer that the status of said USB peripheral device has changed;
i) receiving at said local extender a yet further request from said host computer for the status of said USB peripheral device and having said local extender provide said local record of the transmission speed of said USB peripheral device and its local record of the change in reset status of said USB peripheral device to said host computer;
j) receiving at said local extender a request from said host computer to clear said change in reset status information and having said local extender clear said local record of the change in reset status information; and
k) receiving at said local extender a request from said host computer for the status of said USB peripheral device and having said local extender provide said cleared local record of the change in reset status to said host computer.

3. A method as claimed in claim 2 wherein said method operates over a data communications network in which the round-trip delay exceeds 1 microsecond.

4. A method as claimed in claim 1 which includes the ability to detect the detachment of a USB peripheral device by a host computer, wherein said host computer and said USB peripheral device conform to the requirements of the USB Specification, through a local extender and a remote extender, which method comprises:

a) detecting at said remote extender a device detachment event, having said remote extender send a device disconnect signal to said local extender, and then having said local extender update its local record of the change in connection status of said USB peripheral device and its local record of the connected status of said USB peripheral device;
b) receiving at said local extender a request from said host computer for device status change information and having said local extender inform said host computer that the status of said USB peripheral device has changed;
c) receiving at said local extender a request from said host computer for the status of said USB peripheral device and having said local extender provide said local record of the change in connection status and said local record of connected status to said host computer;
d) receiving at said local extender a request from said host computer to clear said change in connection status information and having said local extender clear said local record of the change in connection status information;
e) receiving at said local extender a request from said host computer to clear enabled status information of said USB peripheral device and having said local extender clear its local record of enabled status information; and
f) receiving at said local extender a further request from said host computer for the status of said USB peripheral device and having said local extender provide said cleared local record of the change in connection status and said cleared local record of enabled status to said host computer.

5. A method as claimed in claim 4 wherein said method operates over a data communications network in which the round-trip delay exceeds 1 microsecond.

6. A method as claimed in claim 1 which includes the ability to determine the network address of a USB function wherein said USB function may be a USB hub or a USB peripheral device, and wherein a plurality of said USB functions may be distributed around a data communications network, and wherein a USB address is allocated to each USB function by a host computer, which method comprises:
a) building a data record for each first USB function connected directly or indirectly to said network and identifying each record by a unique USB address assigned dynamically by said host computer;
b) recording within said data record the USB address of the upstream USB hub to which said first USB function is connected;
c) recording within said data record the port number of the upstream USB hub to which said first USB function is connected;
d) recording within said data record the USB address of each downstream USB function connected directly to said first USB function;
e) recording within said data record the port number of said first USB function to which each downstream USB function is connected; and
f) recording the network address assigned to said first USB function.

7. A method for transmitting data between a host computer and one or a plurality of USB peripheral devices, wherein said USB peripheral devices are distributed around a data communications network and wherein the transmission delay across said network is greater than that normally allowed by the USB specification, said method comprising connecting a host computer to a local extender device, connecting said local extender device to one or a plurality of remote extender devices through a data communication network, and connecting said remote extender devices to one or a plurality of USB peripheral devices, wherein signals between said host computer and said USB peripheral devices are saved, collected, absorbed, or otherwise processed in the local extender and/or the remote extenders so as to allow the host computer and the USB peripheral devices to operate in the presence of a round trip delay greater than that normally allowed in the USB specification, and wherein said method provides for conducting asynchronous data transactions, between a host computer and a USB peripheral device, wherein said host computer operates at high-speed and said USB peripheral device operates at classic-speed (full-speed or low-speed), and wherein said data travels in a device to host direction, through a remote extender and a local extender, which method comprises:
a) receiving at a local extender a first request from said host computer for the start of a split data transfer session, having said local extender forward said first request across a network to said remote extender, and then having said local extender generate a negative acknowledgement response to said host computer;
b) receiving at a local extender a subsequent request from said host computer for the start of a split data transfer session and having said local extender continue to generate negative acknowledgement responses to said host computer until said local extender receives a response to said forwarded first request from said remote extender;
c) receiving at a remote extender said forwarded first request for the start of a split data transfer session, having said remote extender convert said forwarded request for the start of a split data transfer session into a classic-speed request for data transfer, and then having said remote extender forward said classic-speed request for data transfer to said USB peripheral device;
d) generating at a remote extender a positive acknowledgement response and forwarding said positive acknowledgement response across a network to said local extender;
e) receiving at a local extender said forwarded positive acknowledgement response and having said local extender store said forwarded positive acknowledgement response in local memory;
f) receiving at a local extender a further request from said host computer for the start of a split data transfer session, having said local extender retrieve from local memory said forwarded positive acknowledgement response, and then having said local extender forward said retrieved positive acknowledgement response to said host computer;
g) receiving at a remote extender a data transfer response from said USB peripheral device and having said remote extender generate a positive acknowledgement response to said USB peripheral device, and then having said remote extender forward said data transfer response across a network to said local extender;
h) receiving at a local extender a first request for completion of a split data transfer session, having said local extender check local memory for the absence of a data transfer response, and then having said local extender generate a not-yet acknowledgement to said host computer;
i) receiving at a local extender said forwarded data transfer response from said remote extender and having said local extender store said forwarded data transfer response in local memory; and j) receiving at a local extender a further request for completion of a split data transfer session, having said local extender retrieve from local memory said forwarded data transfer response, and then having said local extender forward said retrieved data transfer response to said host computer.

8. A method as claimed in claim 7 wherein said method operates over a data communications network in which the round-trip delay exceeds 1 microsecond.

9. A method for transmitting data between a host computer and one or a plurality of USB peripheral devices, wherein said USB peripheral devices are distributed around a data communications network and wherein the transmission delay across said network is greater than that normally allowed by the USB specification, said method comprising connecting a host computer to a local extender device, connecting said local extender device to one or a plurality of remote extender devices through a data communication network, and connecting said remote extender devices to one or a plurality of USB peripheral devices, wherein signals between said host computer and said USB peripheral devices are saved, collected, absorbed, or otherwise processed in the local extender and/or the remote extenders so as to allow the host computer and the USB peripheral devices to operate in the presence of a round trip delay greater than that normally allowed in the USB specification, and wherein said method provides for conducting asynchronous data transactions between a host computer and a USB peripheral device, wherein said host computer operates at high-speed and said USB peripheral device operates at classic-speed (full-speed or low-speed), and wherein said data travels in a host to device direction, through a local extender and a remote extender, which method comprises:

a) receiving at a local extender a first notification from said host computer for the start of a split data transfer session, having said local extender forward said first notification across a network to said remote extender, and then having said local extender generate a negative acknowledgement response to said host computer;

b) receiving at a local extender a subsequent notification from said host computer for the start of a split data transfer session and having said local extender continue to generate negative acknowledgement responses to said host computer until said local extender receives a response to said forwarded first notification from said remote extender;

c) receiving at a remote extender said forwarded first notification for the start of a split data transfer session, having said remote extender convert said forwarded notification for the start of a split data transfer session into a classic-speed notification for data transfer, and then having said remote extender forward said classic-speed notification for data transfer to said USB peripheral device;

d) generating at a remote extender a positive acknowledgement response and forwarding said positive acknowledgement response across a network to said local extender;

e) receiving at a local extender said forwarded positive acknowledgement response and having said local extender store said forwarded positive acknowledgement response in local memory;

f) receiving at a local extender a further notification from said host computer for the start of a split data transfer session, having said local extender retrieve from local memory said forwarded positive acknowledgement response, and then having said local extender forward said retrieved positive acknowledgement response to said host computer;

g) receiving at a remote extender a positive acknowledgement response from said USB peripheral device and having said remote extender forward said positive acknowledgement response across a network to said local extender;

h) receiving at a local extender a first request for completion of a split data transfer session, having said local extender check local memory for the absence of a positive acknowledgement response, and then having said local extender generate a not-yet acknowledgement to said host computer;

i) receiving at a local extender said forwarded positive acknowledgement response from said remote extender and having said local extender store said forwarded positive acknowledgement response in local memory; and j) receiving at a local extender a further request for completion of a split data transfer session, having said local extender retrieve from local memory said forwarded positive acknowledgement response, and then having said local extender forward said retrieved positive acknowledgement response to said host computer.

10. A method as claimed in claim 9 wherein said method operates over a data communications network in which the round-trip delay exceeds 1 microsecond.

11. A method for transmitting data between a host computer and one or a plurality of USB peripheral devices, wherein said USB peripheral devices are distributed around a data communications network and wherein the transmission delay across said network is greater than that normally allowed by the USB specification, said method comprising connecting a host computer to a local extender device, connecting said local extender device to one or a plurality of remote extender devices through a data communication network, and connecting said remote extender devices to one or a plurality of USB peripheral devices, wherein signals between said host computer and said USB peripheral devices are saved, collected, absorbed, or otherwise processed in the local extender and/or the remote extenders so as to allow the host computer and the USB peripheral devices to operate in the presence of a round trip delay greater than that normally allowed in the USB specification, and wherein said method provides for conducting isochronous data transactions between a host computer and a USB peripheral device, wherein said host computer operates at high-speed and said USB peripheral device operates at classic-speed (full-speed or low-speed), and wherein said data travels in a device to host direction, through a remote extender and a local extender, which method comprises:

a) receiving at a local extender a first request from said host computer for the start of a split data transfer session and having said local extender forward said first request for the start of a split data transfer session across a network to said remote extender;

b) receiving at a local extender a first request for completion of a split data transfer session, having said local extender check local memory for the absence of a complete sequence of split data transfer responses, and then having said local extender generate a null data response to said host computer;

c) receiving at a remote extender said forwarded first request for the start of a split data transfer session, having said remote extender convert said forwarded request for the start of a split data transfer session into a classic-speed request for data transfer, and then having said remote extender forward said classic-speed request for data transfer to said USB peripheral device;
d) receiving at a remote extender a data transfer response from said USB peripheral device and having said remote extender convert said received data transfer response into a sequence of split data transfer responses, and then having said remote extender forward said sequence of split data transfer responses across a network to said local extender;
e) receiving at a local extender said forwarded sequence of split data transfer responses from said remote extender and having said local extender store said forwarded sequence of split data transfer responses in local memory;
f) receiving at a local extender a subsequent request from said host computer for the start of a split data transfer session and having said local extender forward said subsequent request across a network to said remote extender; and
g) receiving at a local extender a sequence of subsequent requests for completion of a split data transfer session, having said local extender check local memory for the presence of a complete sequence of split data transfer responses, and then having said local extender retrieve said sequence of split data responses from memory and forward said sequence of split data responses to said host computer.

12. A method as claimed in claim 11 wherein said method operates over a data communications network in which the round-trip delay exceeds 1 microsecond.

13. A method for transmitting data between a host computer and one or a plurality of USB peripheral devices, wherein said USB peripheral devices are distributed around a data communications network and wherein the transmission delay across said network is greater than that normally allowed by the USB specification, said method comprising connecting a host computer to a local extender device, connecting said local extender device to one or a plurality of remote extender devices through a data communication network, and connecting said remote extender devices to one or a plurality of USB peripheral devices, wherein signals between said host computer and said USB peripheral devices are saved, collected, absorbed, or otherwise processed in the local extender and/or the remote extenders so as to allow the host computer and the USB peripheral devices to operate in the presence of a round trip delay greater than that normally allowed in the USB specification, and wherein said method provides for conducting isochronous data transactions between a host computer and a USB peripheral device, wherein said host computer operates at high-speed and said USB peripheral device operates at classic-speed (full-speed or low-speed), and wherein said data travels in a host to device direction, through a local extender and a remote extender, which method comprises:
a) receiving at a local extender a notification from said host computer for the start of a split data transfer session, having said local extender forward said notification for the start of a split data transfer session across a network to said remote extender, and then having said remote extender store said notification for the start of a split data transfer session in local memory;
b) receiving at a local extender a first notification from said host computer for the continuation of a split data transfer session, having said local extender forward said first notification for the continuation of a split data transfer session across a network to said remote extender, and then having said remote extender store said first notification for the continuation of a split data transfer session in local memory;
c) receiving at a local extender a further notification from said host computer for the continuation of a split data transfer session, having said local extender forward said further notification for the continuation of a split data transfer session across a network to said remote extender, and then having said remote extender store said further notification for the continuation of a split data transfer session in local memory;
d) receiving at a local extender a notification from said host computer for the completion of a split data transfer session, having said local extender forward said notification for the completion of a split data transfer session across a network to said remote extender, and then having said remote extender store said notification for the completion of a split data transfer session in local memory;
e) assembling at a remote extender said stored notification for the start of a split data transfer, said stored first notification for the continuation of a split data transfer, said stored further notification for the continuation of a split data transfer and said stored notification for the completion of a split data transfer session into a classic-speed notification of data transfer; and
f) having said remote extender forward said classic-speed notification of data transfer to said USB peripheral device.

14. A method as claimed in claim 13 wherein said method operates over a data communications network in which the round-trip delay exceeds 1 microsecond.

* * * * *